United States Patent
Hankins et al.

(10) Patent No.: US 8,857,321 B2
(45) Date of Patent: *Oct. 14, 2014

(54) ROLLER GRILL

(75) Inventors: Robert Jeffery Hankins, Garland, TX (US); Raymond E. Davis, Heath, TX (US); William Neal Davis, Emory, TX (US); Clifton Glenn Hampton, Burleson, TX (US); Raymond Michael Davis, Heath, TX (US)

(73) Assignee: ADCO Industries—Technologies, L.P., Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/284,217

(22) Filed: Oct. 28, 2011

(65) Prior Publication Data

US 2013/0104748 A1 May 2, 2013

(51) Int. Cl.
*A47J 37/04* (2006.01)

(52) U.S. Cl.
CPC .................................. *A47J 37/048* (2013.01)
USPC ............................................. 99/441; 99/442

(58) Field of Classification Search
USPC ........... 99/441, 339, 393, 402, 422, 423, 426, 99/442, 443 R, 443 C, 448, 449
See application file for complete search history.

(56) References Cited

U.S. PATENT DOCUMENTS

| | | | |
|---|---|---|---|
| 648,724 A | 5/1900 | Cole | |
| 648,866 A | 5/1900 | Gibford | |
| 2,014,384 A * | 9/1935 | Kruttschnitt | 99/405 |
| 2,185,979 A * | 1/1940 | Dumas | 99/423 |
| 2,253,434 A | 8/1941 | Kernick | |
| 2,290,572 A | 7/1942 | Rakov | |
| 2,453,385 A * | 11/1948 | Rone | 99/423 |
| 2,577,963 A * | 12/1951 | Hagopian | 126/25 A |
| 2,602,392 A * | 7/1952 | Panken | 99/427 |
| 2,604,842 A | 7/1952 | Dolce | |
| 2,656,867 A | 10/1953 | Aguilar et al. | |
| 2,697,395 A | 12/1954 | Steriss | |
| 2,745,363 A * | 5/1956 | Balton | 425/334 |
| 2,813,599 A | 11/1957 | Amberg | |
| 2,905,076 A | 9/1959 | Del Francia | |
| 2,933,934 A | 4/1960 | Haroldson | |
| 3,199,317 A * | 8/1965 | Walsh | 68/22 B |
| 3,298,303 A | 1/1967 | Waller | |
| 3,331,308 A * | 7/1967 | Hoffert | 99/340 |
| 3,472,156 A * | 10/1969 | Bardeau | 99/423 |
| 3,492,938 A * | 2/1970 | Kaffer et al. | 99/339 |

(Continued)

OTHER PUBLICATIONS

PhyMet, Inc., "MicroPoly Product Catalog," May 2011, downloaded on Feb. 23, 2011, from www.micropolylubricants.com (19 pages).

*Primary Examiner* — Henry Yuen
*Assistant Examiner* — Eric Stapleton
(74) *Attorney, Agent, or Firm* — Fish & Richardson P.C.

(57) ABSTRACT

A roller grill for heating a pre-cooked food product includes a plurality of tubes having outer surfaces adapted to transfer heat to the pre-cooked food product; a plurality of spur gears, each spur gear mounted on an end of a corresponding tube; and a drive assembly. The drive assembly includes a motor; a timing pulley coupled to a shaft having a plurality of worm gears mounted thereon; and a timing belt coupled to the motor and the timing pulley and adapted to transfer rotary motion generated by the motor into rotary motion of the tubes through contacting engagement of the worm gears with the spur gears.

21 Claims, 21 Drawing Sheets

(56) References Cited

U.S. PATENT DOCUMENTS

| | | |
|---|---|---|
| 3,611,913 A * | 10/1971 | McGinley .................. 99/349 |
| 3,639,077 A | 2/1972 | Slates |
| 3,682,088 A * | 8/1972 | Paniez .................. 99/277.2 |
| 3,692,351 A | 9/1972 | Christopher et al. |
| 3,756,219 A | 9/1973 | Snyder et al. |
| 3,804,228 A * | 4/1974 | Felstehausen ............. 198/431 |
| 3,854,392 A * | 12/1974 | Eason .................. 99/421 H |
| 3,858,500 A * | 1/1975 | Rohm et al. ............. 99/504 |
| 3,981,233 A | 9/1976 | Nugarus |
| 4,154,154 A * | 5/1979 | Vivian ................. 99/421 HH |
| 4,370,920 A * | 2/1983 | Henriques et al. .......... 99/339 |
| 4,516,485 A | 5/1985 | Miller |
| 4,578,120 A | 3/1986 | Chiarella |
| 4,593,923 A | 6/1986 | Thalmann |
| 4,627,368 A * | 12/1986 | Reich .................... 112/83 |
| 4,683,813 A * | 8/1987 | Schultz .................. 99/353 |
| 4,891,037 A | 1/1990 | Maples |
| 5,020,637 A | 6/1991 | Hoenselaar et al. |
| 5,058,493 A | 10/1991 | Basek et al. |
| 5,117,748 A | 6/1992 | Costa |
| 5,184,374 A * | 2/1993 | Barauke et al. ............ 19/262 |
| 5,213,180 A | 5/1993 | Masonek et al. |
| 5,360,084 A | 11/1994 | Graf |
| 5,458,051 A | 10/1995 | Alden et al. |
| 5,484,038 A | 1/1996 | Rowell |
| 5,549,040 A | 8/1996 | Naramura |
| 5,611,263 A * | 3/1997 | Huang .................... 99/339 |
| 5,664,347 A | 9/1997 | Chapman et al. |
| 5,669,290 A * | 9/1997 | Natsumi et al. ........... 99/421 H |
| 5,669,839 A | 9/1997 | Graf et al. |
| 5,722,315 A | 3/1998 | Naramura |
| 5,758,568 A * | 6/1998 | Moravec .................. 99/349 |
| 5,870,949 A * | 2/1999 | Cimperman et al. ......... 99/559 |
| 5,901,637 A * | 5/1999 | Glucksman et al. ......... 99/326 |
| 6,047,633 A | 4/2000 | Khaytman |
| 6,079,319 A * | 6/2000 | Doria .................... 99/331 |
| 6,166,353 A | 12/2000 | Senneville et al. |
| 6,257,369 B1 | 7/2001 | Pesl |
| 6,263,656 B1 * | 7/2001 | Barauke .................. 57/315 |
| 6,349,634 B1 * | 2/2002 | Delpierre et al. ........... 99/441 |
| 6,354,193 B1 * | 3/2002 | Lee ...................... 99/334 |
| 6,393,971 B1 | 5/2002 | Hunot et al. |
| 6,439,109 B1 | 8/2002 | Rehill |
| 6,478,115 B1 | 11/2002 | Wech et al. |
| 6,626,660 B1 * | 9/2003 | Olson et al. ............. 425/190 |
| 6,707,015 B2 | 3/2004 | Huegerich et al. |
| 6,782,802 B2 | 8/2004 | Hunot et al. |
| 6,942,409 B2 | 9/2005 | Barbieri |
| 7,152,571 B1 | 12/2006 | Wilson et al. |
| 7,334,517 B2 | 2/2008 | Gaskill et al. |
| 7,367,261 B2 | 5/2008 | Gaskill et al. |
| 7,520,211 B2 | 4/2009 | Hunot et al. |
| 7,591,220 B2 | 9/2009 | Sheridan, Jr. |
| 8,109,365 B2 | 2/2012 | Taguchi et al. |
| 2001/0045345 A1 | 11/2001 | Luigi |
| 2002/0017202 A1 | 2/2002 | Hunot et al. |
| 2002/0148359 A1 * | 10/2002 | Hunot et al. ............. 99/341 |
| 2002/0195002 A1 * | 12/2002 | Dominguez et al. ......... 99/357 |
| 2003/0132088 A1 * | 7/2003 | Watanabe et al. .......... 198/835 |
| 2003/0197001 A1 | 10/2003 | Grohs |
| 2004/0255561 A1 | 12/2004 | Heilman |
| 2005/0045131 A1 | 3/2005 | Okazawa |
| 2005/0049096 A1 | 3/2005 | Eck |
| 2005/0051037 A1 | 3/2005 | Gaskill et al. |
| 2005/0061161 A1 | 3/2005 | Hunot et al. |
| 2005/0064972 A1 | 3/2005 | Rusheidat et al. |
| 2005/0260319 A1 | 11/2005 | Khalaf |
| 2006/0115557 A1 | 6/2006 | Schlienger et al. |
| 2006/0260477 A1 * | 11/2006 | Jackman et al. ........... 99/485 |
| 2006/0260874 A1 | 11/2006 | Lockledge et al. |
| 2007/0059413 A1 | 3/2007 | Hartmann |
| 2007/0102418 A1 | 5/2007 | Swank et al. |
| 2007/0232427 A1 | 10/2007 | Ueno et al. |
| 2008/0022799 A1 * | 1/2008 | Kashimura ................ 74/460 |
| 2008/0022800 A1 * | 1/2008 | Kobayashi ................ 74/462 |
| 2008/0090687 A1 | 4/2008 | Eck |
| 2008/0282903 A1 | 11/2008 | Gonzalez |
| 2009/0092718 A1 * | 4/2009 | Mendenhall et al. ........ 426/383 |
| 2009/0277299 A1 * | 11/2009 | Gmirya ................. 74/665 A |
| 2010/0064874 A1 | 3/2010 | Nagorka |
| 2010/0089702 A1 | 4/2010 | Sasaki et al. |
| 2010/0122630 A1 | 5/2010 | Nimerovskiy |
| 2010/0183784 A1 | 7/2010 | Van Blokland |
| 2010/0255158 A1 | 10/2010 | Luther |
| 2010/0264346 A1 * | 10/2010 | Bussear ................. 251/250.5 |
| 2010/0297321 A1 | 11/2010 | Strauch |
| 2012/0103319 A1 | 5/2012 | Sheridan |
| 2012/0204902 A1 | 8/2012 | Petersen |

\* cited by examiner

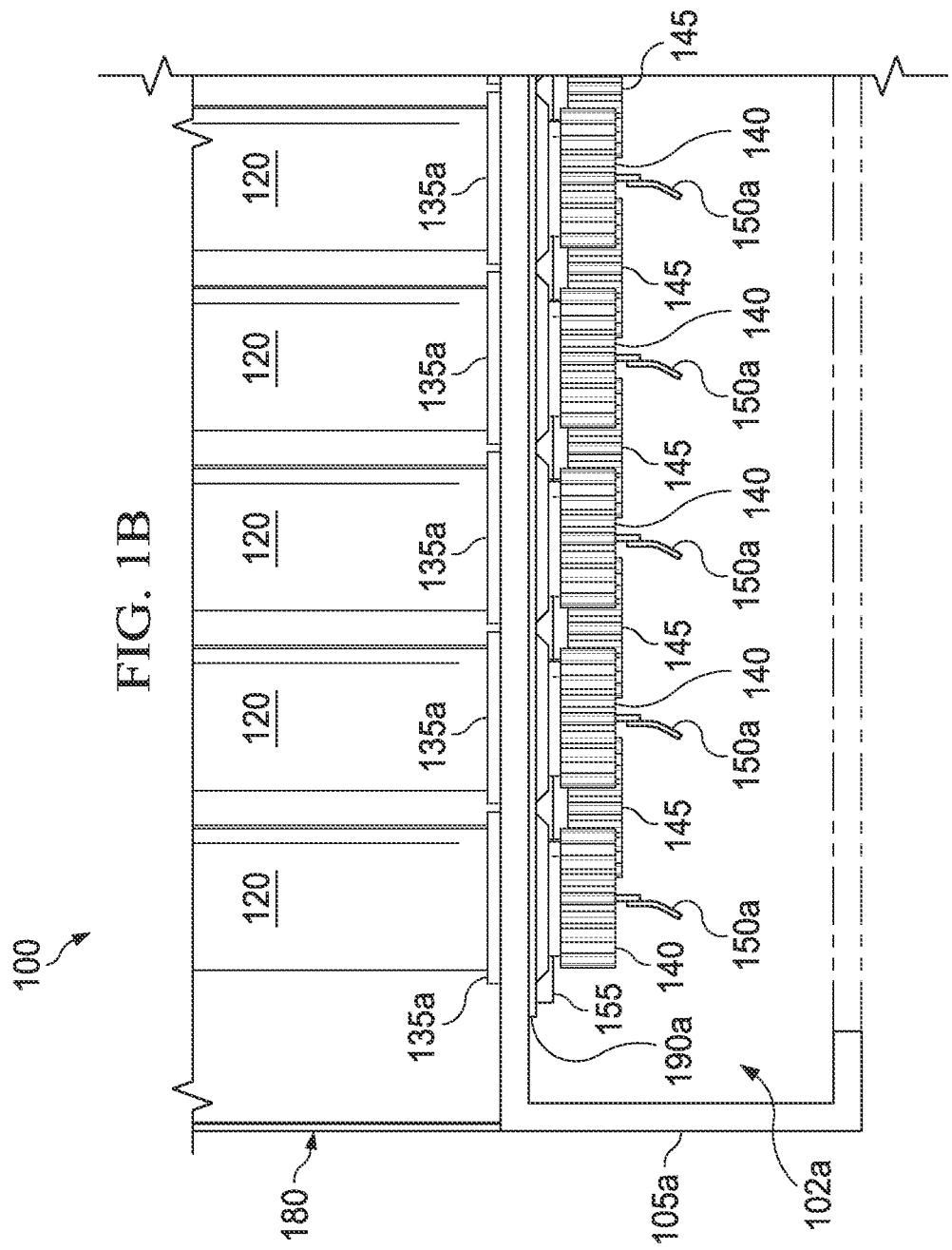

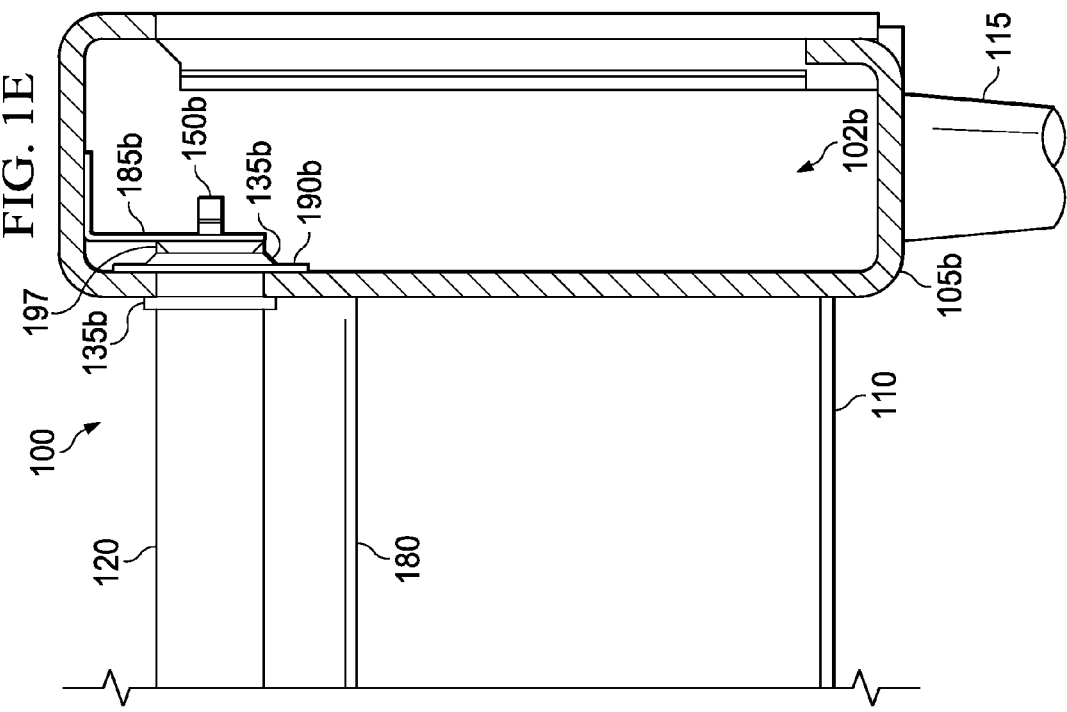
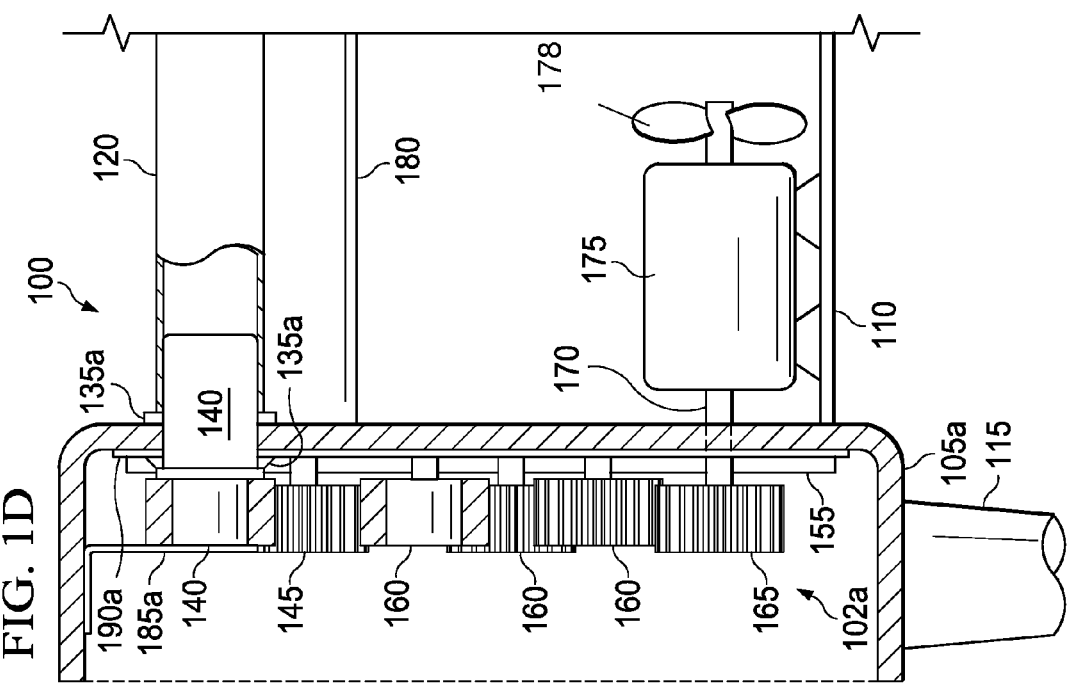

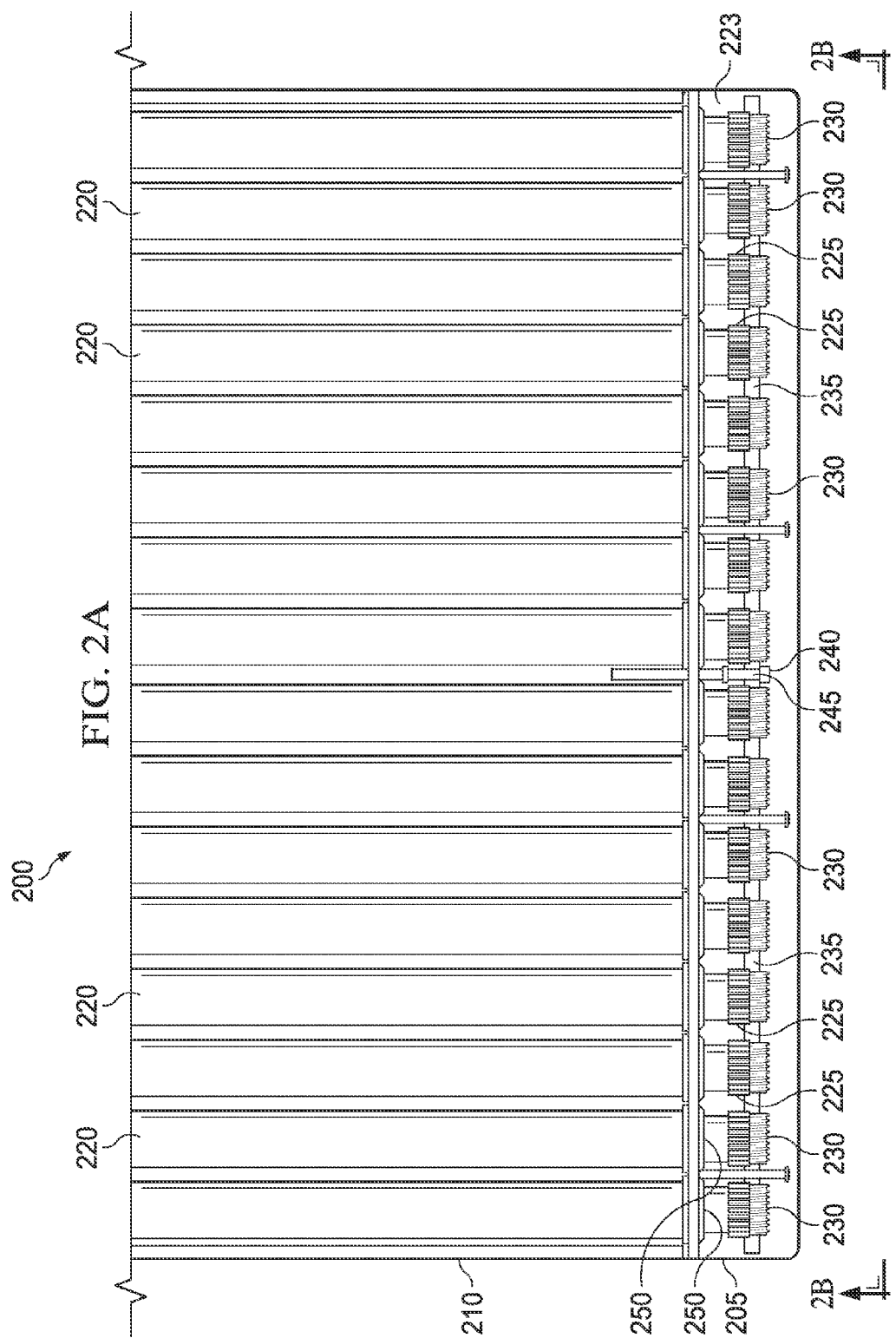

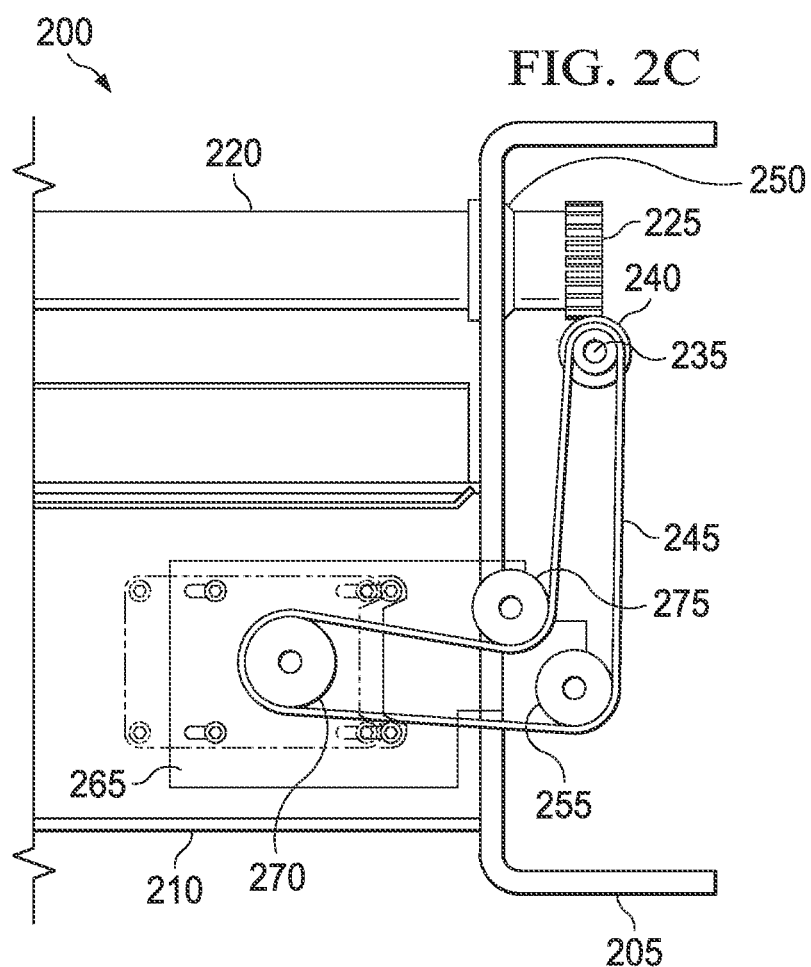

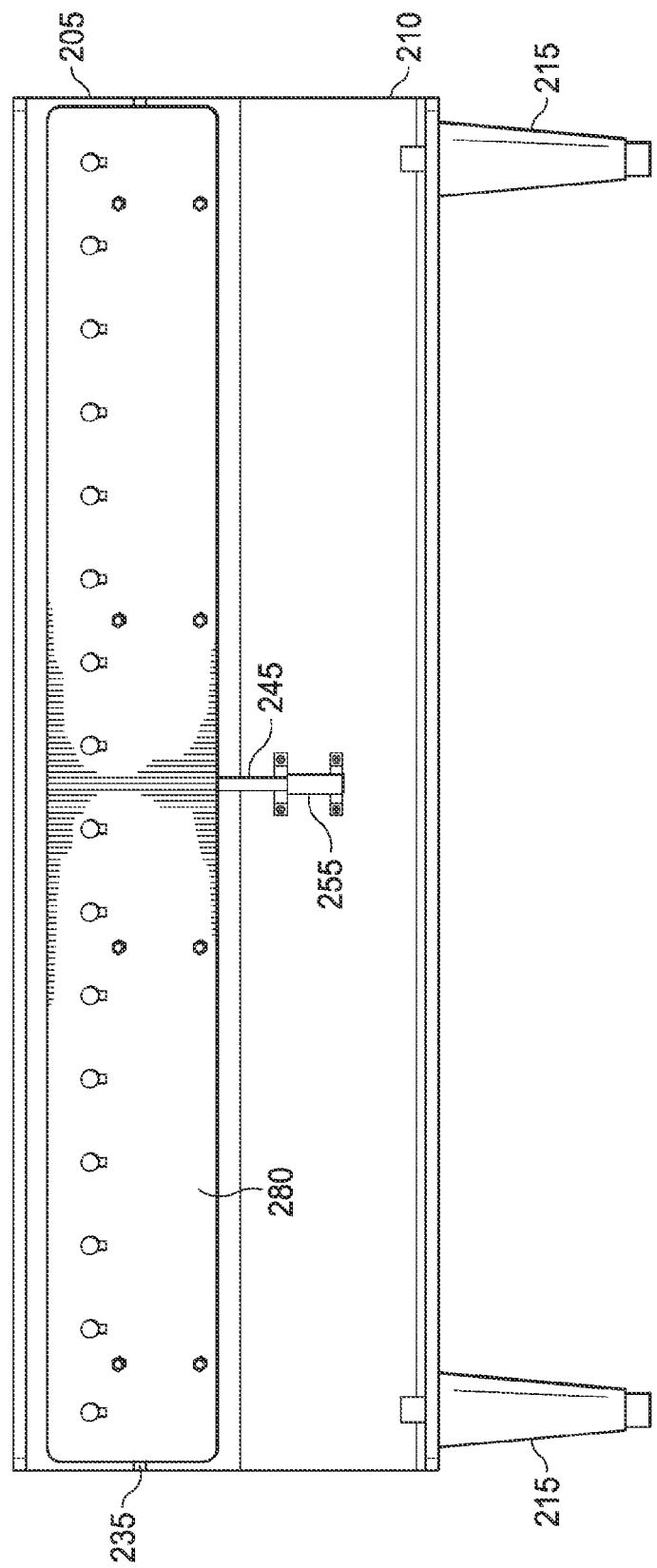

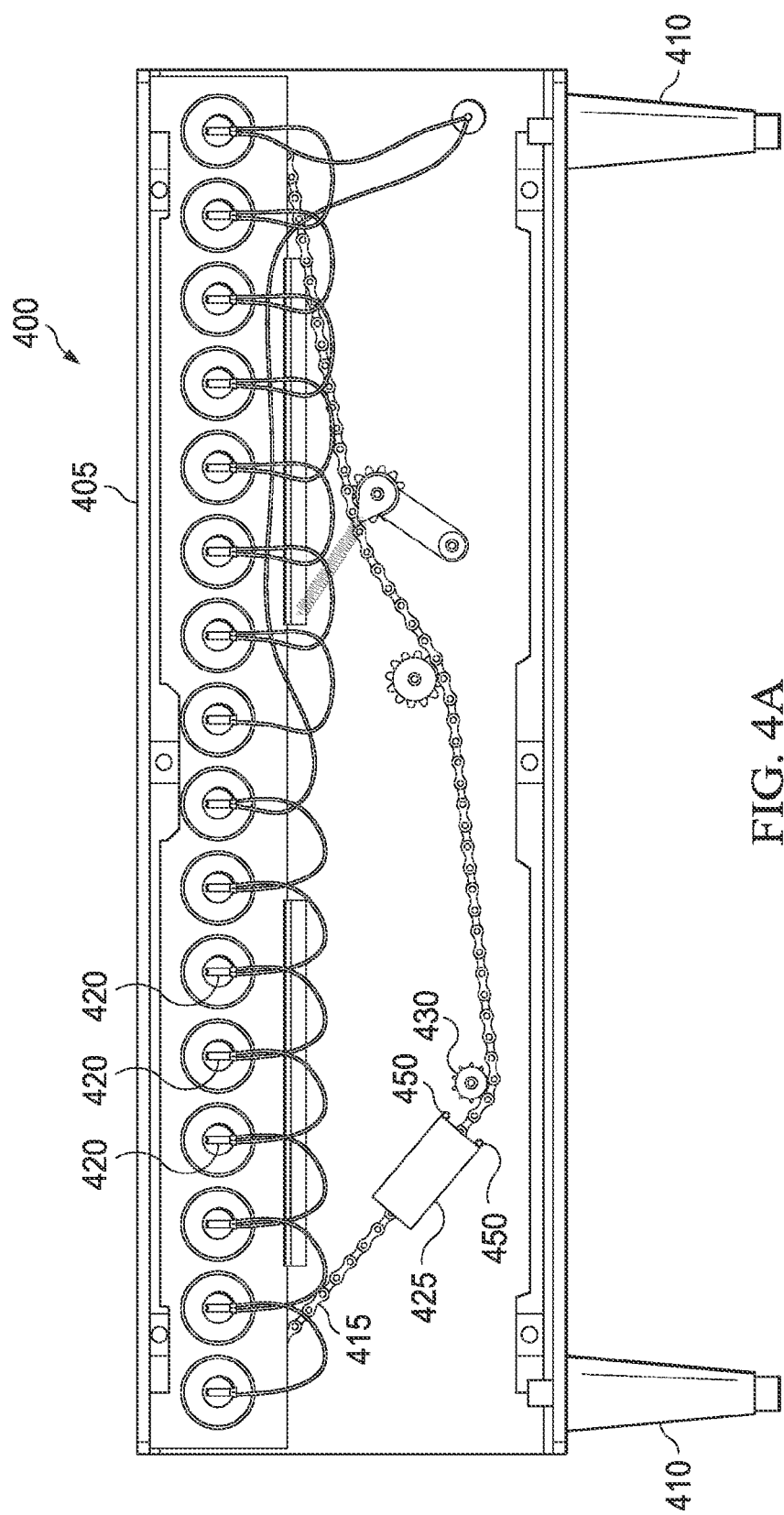

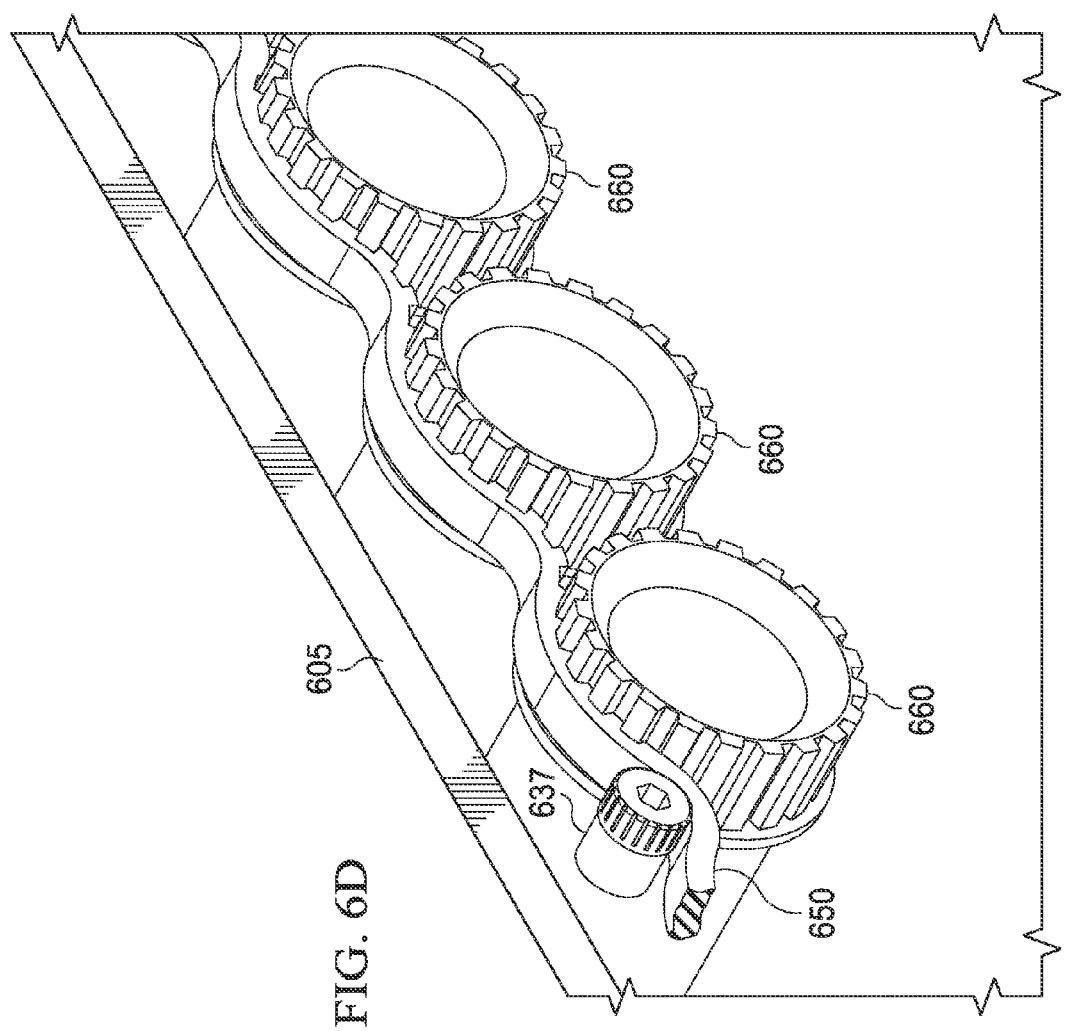

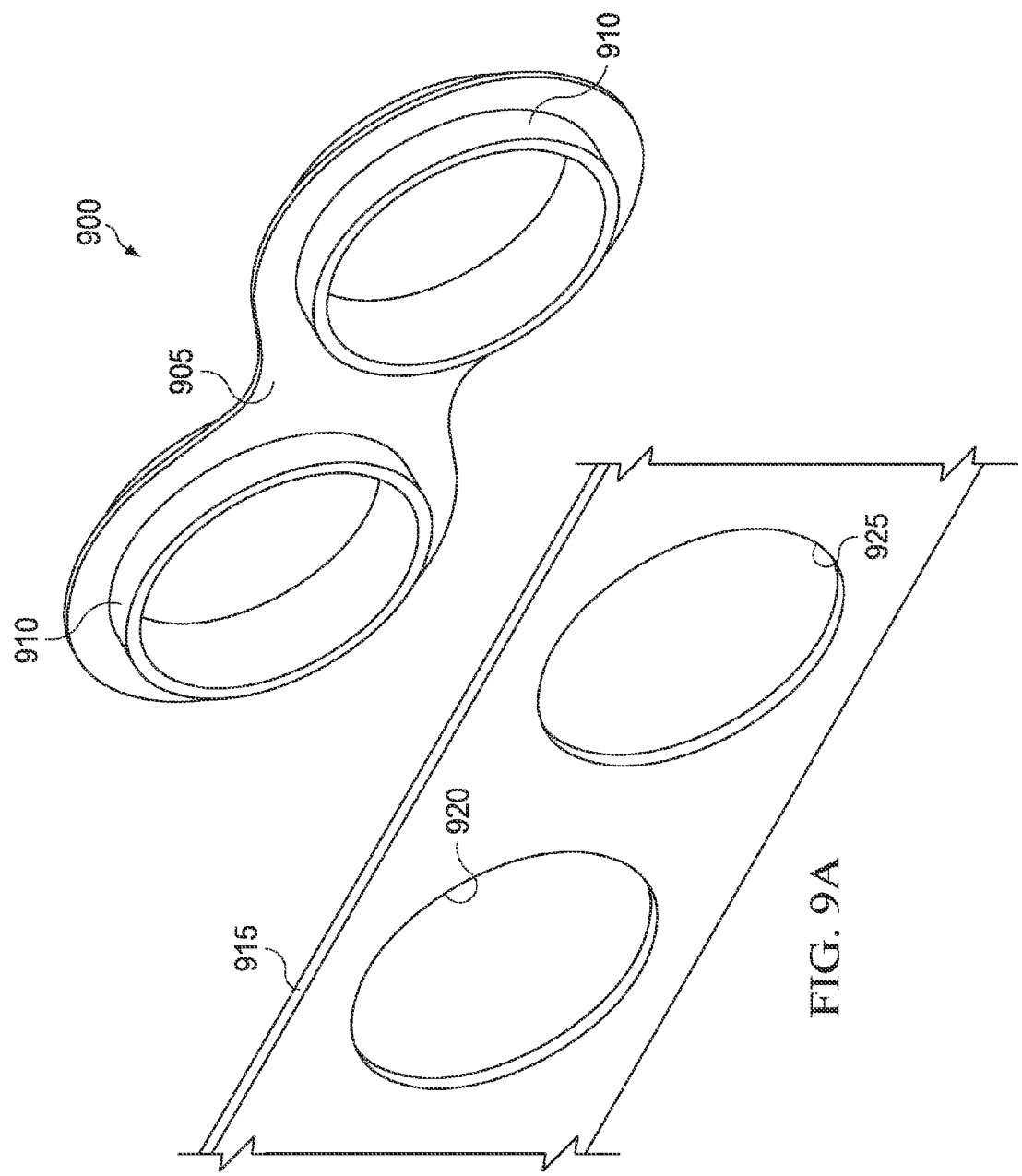

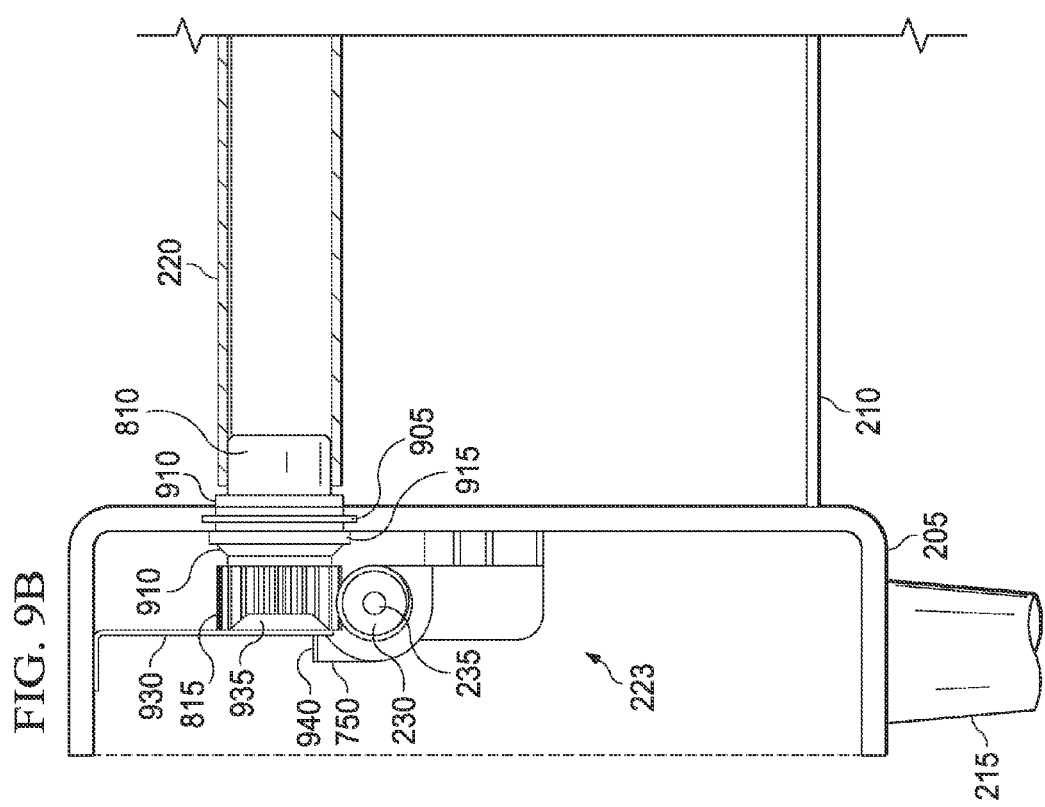

ROLLER GRILL

TECHNICAL BACKGROUND

This disclosure relates to a roller grill or griddle for heating and/or reheating pre-cooked food product.

BACKGROUND

Various apparatus are used to heat and/or reheat prepared consumer pre-cooked food products. In some instances, cylindrically shaped pre-cooked food products, such as hot-dogs, tacquitos, cheese burger bites, and sausage links, may be prepared using a roller grill apparatus, which may include a number of heated, rotating tubes upon which the pre-cooked food products rest and rotate. While the heat conducting and/or radiating from the tubes and the rotation of the tubes allow the pre-cooked food products to be heated substantially uniformly, these features can also impose detrimental effects on other components of the roller grill apparatus. For example, heat conducted and/or radiated from the ends of the tubes is transferred to rotating drive mechanism components in contact with the ends of the tubes, such as chains, lubricants, bearings, and other components. The heat conducted and/or radiated through these components, as well as the mechanical engagement of these components with one another during operation of the roller grill apparatus, can cause gradual deterioration and eventual failure of such components.

Conventionally, roller grills and/or griddles used for heating and/or reheating pre-cooked food products have used chain drive assemblies to drive (e.g., rotate) tubular heating surfaces on which the pre-cooked food products may be placed. The chain drive assemblies typically utilize a metallic chain that engages metallic sprockets mounted on the tubular heating surfaces. Due in part to the metal-on-metal contact, as well as the heat energy conducted through and/or radiated from the sprockets and chain from the tubular heating surfaces (and other components of conventional roller grills), the chain drive assembly may require regular maintenance (e.g., lubrication, adjustment of the chain and/or the sprockets to maintain suitable engagement, and otherwise). Without such regular maintenance, conventional roller grills often experience high failure rates.

In some instances, pre-cooked food products must be heated to a minimum internal temperature in order to, for example, kill bacteria that can cause food related illness. For instance, certain standards (e.g., NSF International) have been established that require pre-cooked food product to be heated to a minimum internal temperature for safety reasons.

SUMMARY

In one general embodiment, a roller grill for heating a pre-cooked food product includes a plurality of tubes having outer surfaces adapted to transfer heat to the pre-cooked food product; a plurality of spur gears, each spur gear mounted on an end of a corresponding tube; and a drive assembly. The drive assembly includes a motor; a timing pulley coupled to a shaft having a plurality of worm gears mounted thereon; and a timing belt coupled to the motor and the timing pulley and adapted to transfer rotary motion generated by the motor into rotary motion of the tubes through contacting engagement of the worm gears with the spur gears.

In a first aspect combinable with the general embodiment, at least one of the spur gears is a helical spur gear.

In a second aspect combinable with any of the previous aspects, at least one of the worm gears is a screw worm gear.

In a third aspect combinable with any of the previous aspects, the timing belt includes a plurality of teeth protruding from a surface of the timing belt.

In a fourth aspect combinable with any of the previous aspects, the teeth are engageable with a plurality of corresponding teeth disposed on a surface of the timing pulley.

A fifth aspect combinable with any of the previous aspects includes a side housing, where the plurality of tubes are mounted through a panel of the side housing.

In a sixth aspect combinable with any of the previous aspects, the worm gears are engaged with the spur gears within a plenum defined by the side housing.

In a seventh aspect combinable with any of the previous aspects, the plurality of tubes extend through a volume of the roller grill adjacent a first side of the panel opposite a second side of the panel adjacent the plenum.

In an eighth aspect combinable with any of the previous aspects, the plenum has a width of approximately 1.625 inches (4.128 cm).

A ninth aspect combinable with any of the previous aspects includes a cover plate mounted within the plenum adjacent the worm gears and spur gears.

In a tenth aspect combinable with any of the previous aspects, the cover plate includes a heat sink adapted to receive heat transferred from the tubes through the plenum.

In an eleventh aspect combinable with any of the previous aspects includes a bottom housing adapted to at least partially enclose the motor.

In a twelfth aspect combinable with any of the previous aspects, the timing belt extends from the bottom housing through the panel and into the plenum to engage the timing pulley.

In a thirteenth aspect combinable with any of the previous aspects includes a plurality of heating elements.

In a fourteenth aspect combinable with any of the previous aspects, at least one of the plurality of heating elements extends through a bore of one of the tubes.

In a fifteenth aspect combinable with any of the previous aspects, each of the plurality of tubes includes a heating surface having a length of approximately 32.5 inches (82.6 cm).

In a sixteenth aspect combinable with any of the previous aspects, the plurality of tubes includes at least 8 tubes.

In a seventeenth aspect combinable with any of the previous aspects, a ratio of spur gears to worm gears is 1:1 or 2:1.

In an eighteenth aspect combinable with any of the previous aspects includes a timing gear mounted on the shaft and engageable with the timing belt.

In a nineteenth aspect combinable with any of the previous aspects, at least one of the spur gears comprises a self-lubricating gear.

Various embodiments of a roller grill according to the present disclosure may include one or more of the following features. For example, the roller grill may operate in one or more selectable heating and/or reheating modes, such as a "Preparation" mode or a "Ready-to-Serve" mode. In some embodiments, the roller grill can include one or more of a cover plate and a plenum plate that serve as heat sinks by absorbing heat radiating from roller grill heating tubes and/or from drive assembly components included within the roller grill.

Various embodiments of a roller grill according to the present disclosure may also include one or more of the following features. For example, the roller grill may include a lubricator designed to clean and lubricate a drive chain included within the roller grill, such that an appropriate amount of lubricant is provided to the drive chain during operation of the roller grill. Furthermore, the lubricator may be used with any chain-driven system that needs regular lubrication maintenance, such as a bicycle chain. In some embodiments, the roller grill may have a chain glide that causes the drive chain of the roller grill to engage more than one tooth of sprockets (e.g., sprockets located between end sprockets) included within the roller grill. This multiple tooth engagement may reduce the probability of the chain being displaced from the sprockets and reducing the frictional wear on the chain and on the sprockets. In some examples, the roller grill can include rollers that increase the engagement of the drive chain with teeth on more than one sprocket at the same time.

Various embodiments of a roller grill according to the present disclosure may also include one or more of the following features. For example, the roller grill may utilize a belt drive assembly coupled to a worm gear assembly (e.g., a screw worm gear assembly) to rotate one or more heating tubes. In some examples, the cooling cycle can extend the life of the timing belt and/or provide the timing belt with a longer life as compared to a drive chain. In some examples, the cooling cycle can drop the temperature of the timing belt by up to 50° F. In some embodiments, the cooling cycle may provide the timing belt with a life of up to six years. In some embodiments, the roller grill may utilize a direct drive assembly, thereby eliminating belts and chains.

These general and specific embodiments may be implemented using a device, system or method, or any combinations of devices, systems, or methods. The details of one or more embodiments are set forth in the accompanying drawings and the description below. Other features, objects, and advantages will be apparent from the description and drawings, and from the claims.

DESCRIPTION OF DRAWINGS

FIGS. 1A-1E illustrate views of an example embodiment of a roller grill utilizing a direct drive assembly in accordance with the present disclosure;

FIGS. 2A-2D illustrate views of an example embodiment of a roller grill including a belt drive assembly including one or more worm gears in accordance with the present embodiments;

FIGS. 4A-4C illustrate views of another example embodiment of a roller grill utilizing a chain drive assembly in accordance with the present disclosure;

FIGS. 6A-6D illustrate views of example embodiments of a roller grill having a chain drive assembly or a belt drive assembly according to the present disclosure;

FIGS. 9A-9B illustrates an example bushing plate that may be used in a roller.

DETAILED DESCRIPTION

Figure 1A:
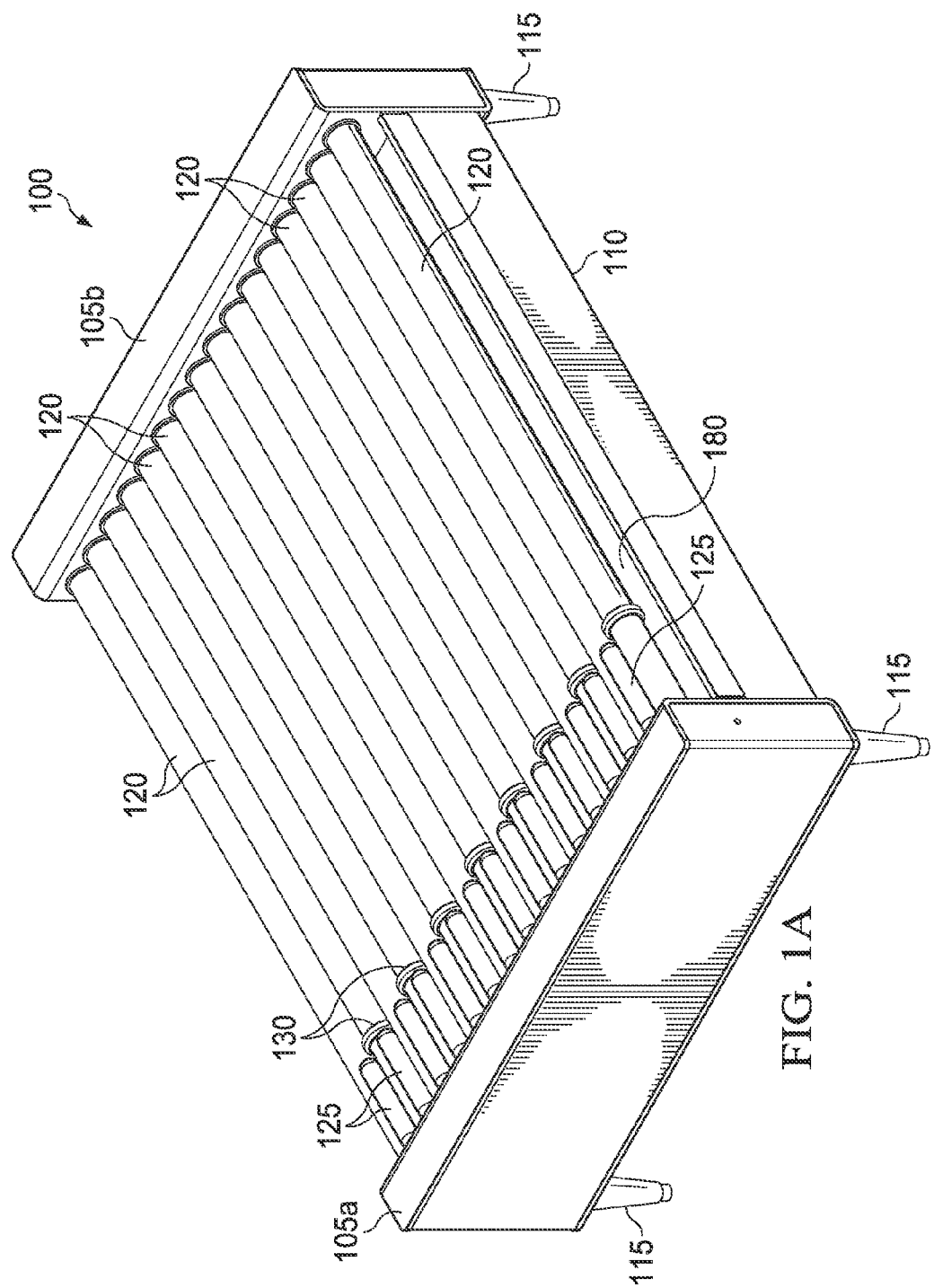

This disclosure relates to apparatus for heating and/or reheating prepared consumer pre-cooked food products, and more particularly, to roller grills and/or griddles used for heating and/or reheating cylindrically shaped pre-cooked food products, such as hotdogs and sausage links. Although in some embodiments, a roller grill according to the present disclosure may only heat and/or reheat a pre-cooked food product, in other embodiments, a roller grill according to the present disclosure may cook a raw food product.

In a general embodiment, a roller grill includes two side housings, a bottom housing, and multiple heating tubes that are disposed parallel to one another, across a volume defined between upper regions of opposite panels of the two side housings, and above the bottom housing. The heating tubes are positioned sufficiently close to one another, such that their positioning allows a pre-cooked food product to simultaneously rest atop two adjacent heating tubes. The heating tubes are further designed to rotate 360 degrees and have outer surfaces that are adapted to transfer heat to pre-cooked food products, thereby allowing the heating tubes to heat and/or reheat pre-cooked food products that rest atop the heating tubes.

In some embodiments, the roller grill may include a belt drive assembly having worm gears that provides rotary motion to the heating tubes. For example, the belt drive assembly can be driven by a motor that provides rotary motion to a timing belt that transfers the motion to a timing pulley, which further rotates a shaft on which worm gears are mounted and engage spur gears that are coupled to ends of the heating tubes. In some embodiments, the belt drive assembly can have timing pulleys coupled to the ends of the heating tubes and multiple idler pulleys that provide alternating heating and cooling cycles, respectively, for the timing belt during operation of the roller grill. In some examples, the timing pulleys can be maintained on the ends of the heating tubes by TEFLON™ flanges.

In some embodiments, the roller grill may include a chain drive assembly having sprockets that provides rotary motion to the heating tubes. For example, the chain drive assembly can be driven by a motor that provides rotary motion to a chain, which transfers the motion to sprockets coupled to the ends of the heating tubes. In some embodiments, the roller grill can further include a lubricator that surrounds the chain and cleans and lubricates and cools the chain substantially constantly such that an appropriate amount of lubricant is provided to the chain. In some embodiments, the roller grill can include one or both of a chain glide or multiple rollers that cause the chain to simultaneously engage more than one tooth of the sprockets, which may reduce the wear on one or both of the chain or the sprockets.

In some embodiments, the roller grill may have a direct drive assembly including a drive gear coupled to a motor and in engagement with one or more transfer gears configured to transfer rotational motion of the drive gear to matched sets of gears directly coupled to heating tubes. The gears may, in some embodiments, be spur gears. In some embodiments, the gears may be helical spur gears. In some embodiments, the gears may be non-metallic, such as, for example, a high-temperature plastic, In some embodiments, for example, one or more gears directly coupled to heating tubes may be a high-temperature plastic such as, for example, polystyrene, nylon, TEFLON™, polyethylene, polypropylene, polyvinyl chloride and polytetrafluoroethylene (PTFE), and other plastic material) that has a continual duty max temperature rating of between about 250° F. (121° C.) and about 500° F. (260° C.). In some embodiments, for example, one or more transfer and/or idler gears may be a high-temperature plastic that has a continual duty max temperature rating of between about 120° F. (49° C.) and about 200° F. (93° C.).

FIGS. 1A-1E illustrate views of an example embodiment of a roller grill 100 utilizing a direct drive assembly for heating and/or reheating pre-cooked food products, such as, for example, cylindrically shaped pre-cooked food products including hotdogs, sausage links, and other products. With reference to FIG. 1A in particular, the roller grill 100 includes two side housings 105a and 105b and a bottom housing 110 that is attached to and disposed between lower regions of panels of the two side housings 105a and 105b. The weight of the roller grill 100 is supported by multiple legs 115 that are mounted underneath and near corners of the bottom housing 110. The roller grill 100 further includes multiple heating tubes 120 that are disposed parallel to one another, across a volume defined between upper regions of opposite panels of the two side housings 105a and 105b, and above the bottom housing 110. The heating tubes 120 are positioned sufficiently close to one another, such that their positioning allows a pre-cooked food product 125 to simultaneously rest atop two adjacent heating tubes 120. One or more annular shaped dividers 130 may be mounted on one or more heating tubes 120 in order to prevent contact between two pre-cooked food products 125 resting atop common heating tubes 120 or to restrict lateral movement of pre-cooked food products 125 resting atop the heating tubes 120.

In some embodiments, the roller grill 100 may be approximately 36 inches (91 cm) in total length, and the heating tubes 120 may be approximately 35.625 inches (90.488 cm) in length. In some examples, the wall thickness of a heating tube may be between approximately 5/64 inches (0.20 cm) and approximately 1/8 inches (0.32 cm). In some examples, the width of the roller grill 100 may depend on the number of heating tubes 120 included within the roller grill 100. In some examples, the roller grill 100 can include multiple (e.g., 4, 8, 16, or other number) heating tubes 120.

In some embodiments, the heating tubes 120 have outer surfaces that are adapted to transfer heat to pre-cooked food products 125 (e.g., non-stick surfaces, cleanable surfaces, or otherwise). The heating tubes 120, in some embodiments, are further designed to rotate 360 degrees, which consequently rotates the pre-cooked food products 125 360 degrees that are in contact with the heating tubes 120. The heating tubes 120 may be heated by multiple electric resistive heat elements. In some embodiments, at least one of the electric resistive heat elements may be disposed within a bore of at least one of the heating tubes 120. In some examples, the heat conducted to the surfaces of the heating tubes 120 allows them to heat/and or reheat the pre-cooked food products 125. In some instances, the electric resistive heat elements can enable the surface temperatures of the heating tubes 120 to reach up to 300° F. (149° C.). In any event, the heating tubes 120 can heat the pre-cooked food products 125 to an internal temperature of about 160° F. (71° C.), or other temperature, to ensure that any bacteria is killed and/or eliminated.

As illustrated, the roller grill 100 may also include a drip plate 180 extending between the side housings 105a and 105b and underneath the heating tubes 120. In some embodiments, the drip plate 180 may define a bottom side of a volume extending from directly underneath the heating tubes 120 to the drip plate 180 and between the side housings 105a and 105b. Such a volume, in some embodiments, may define a sanitary volume into which no mechanical components of the roller grill 100 (e.g., gears, motors, shafts, and other components) may extend. The drip plate 180 may, in some embodiments, be a cleanable surface that catches drippings and other solids and/or liquids from the pre-cooked food product 125.

In some embodiments, the roller grill 100 can include a controller (not shown) that sets the roller grill 100 to operate in one or more heating modes. For example, the heating modes may include a "Preparation" mode that heats pre-cooked food products 125 to a set minimum preparation temperature (e.g., 160° F. (71° C.) internal) or a "Ready-to-Serve" mode that maintains the internal temperature of the pre-cooked food products 125 at a set serving temperature by cycling the heat on and off. In some examples, the preparation temperature of the heating tubes 120 may reach up to 300° F. (149° C.). In some examples, the serving temperature of the heating tubes 120 may reach up to 240° F. (116° C.) in order to maintain an internal pre-cooked food product temperature in the range of 140-160° F. (60-71° C.). The roller grill 100 can further be designed to operate in other heating modes (e.g., a timed heating mode, an overnight heating mode, a "wake up" heating mode, and others).

Turning to FIGS. 1B-1E, top, end, and side views of a portion of the roller grill 100 utilizing a direct drive assembly are illustrated. As illustrated, the roller grill 100 includes a plenums 102a and 102b enclosed within the side housings 105a and 105b in which the direct drive assembly may be disposed. The direct drive assembly may drive (e.g., rotate) the heating tubes 120 to heat and/or reheat pre-cooked food product. As illustrated, each heating tube 120 is installed over a tubular portion of a heating tube gear 140, which in turn, is installed through apertures in the side housing 105. A bushing 135a may also be installed through the aperture of the side housing 105 such that the heating tube 120 is disposed within the bushing 135a and may move (e.g., rotate) within the bushing 135a. In some embodiments, as illustrated in FIG. 9A, the bushing 135a may be a paired bushing, such that two heating tubes 120 are inserted through a single bushing 135a.

Figure 1C:
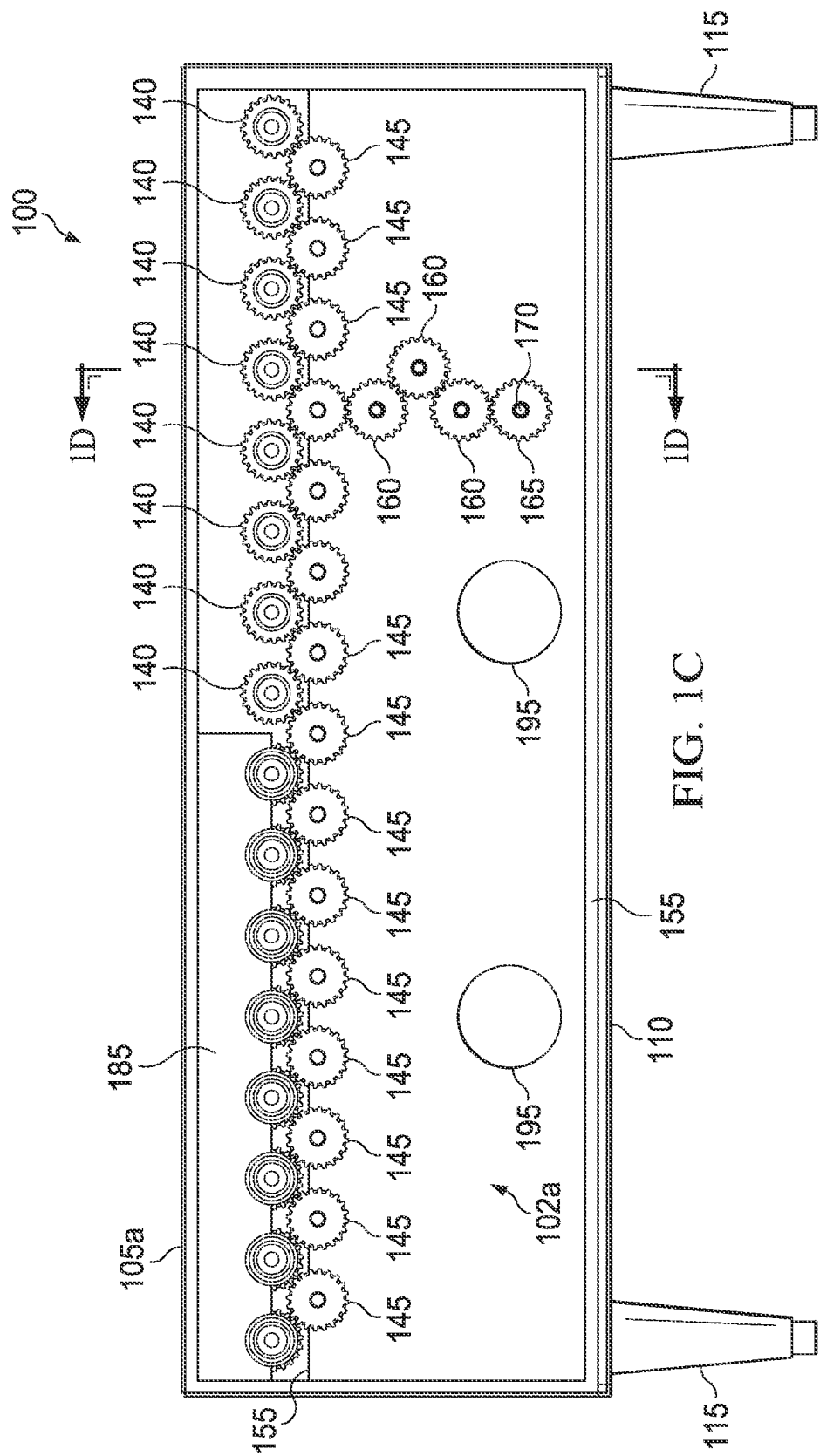

In the illustrated embodiment, a plenum plate 155 may be installed in the plenum 102a and to a surface of the side housing 105. As illustrated, the plenum plate 155 may extend substantially an entire width of the plenum 102a (as shown in FIG. 1C) and from a bottom edge of the plenum 102a to just above a midpoint of one or more idler gears 145. In some embodiments, the idler gears 145, as well as one or more transfer gears 160, may be mounted to the plenum plate 155. For instance, the gears 145 and 160 may be mounted through a mechanical fastener disposed through an axis of the particular gear and through the plenum plate 155. In alternative embodiments, studs may be mounted (e.g., welded) on to the plenum plate 155 over which the gears 145 and 160 may be mounted. In any event, the gears 145 and 160 may be free-spinning gears mounted to the plenum plate 155 without penetrations through the side housing 105 (e.g., into a sanitary volume below the pre-cooked food product 125).

In the illustrated embodiment of the roller grill 100, the plenum plate 155 include one or more ventilation holes 195 that allow fluid (e.g., airflow) communication between the plenum 102a and a volume defined between the bottom housing 110 and the drip plate 180 and also defined between the side housing 105. In some embodiments, airflow may be circulated between the plenum 102a and an ambient airspace through, for example, the ventilation holes 195 and one or more louvered openings in the bottom housing 110.

In the illustrated embodiment, a retainer plate 190a (e.g., the retainer plate 915 shown in FIG. 9A) may be mounted over the bushing 135a through attachment (e.g., mechanical) with the side housing 105. The retainer plate 190a may sandwich the bushing 135a against the side housing 105, thereby preventing (all or partially) rotational movement of the bushing 135a during movement (e.g., rotation) of the heating tubes 120.

FIG. 1B illustrates heating elements 150a (e.g., heaters with spade terminals) to which wires may be coupled and thereby electrically coupled to a power source. The heating elements 150*a* may, in some embodiments, be an electric resistance heater installed through the heating tube 120 (e.g., all or partially) that may generate heat power to increase a temperature of an outer surface of the heating tube 120. In some embodiments, each heating tube 120 may include an individual heating element 150*a*. Alternatively, heating elements 150*a* may be installed in every other heating tube 120 (e.g., alternating heating tubes 120) or otherwise.

In the illustrated roller grill 100, the idler gears 145 are mounted below and engaged with the heating tube gears 140. Further, the illustrated roller grill 100 includes a drive gear 165 disposed on a shaft 170 of a motor 175 including a fan 178 (shown in FIG. 1D) that may be mounted in a bottom cavity of the roller grill 100 (defined by the side housings 105*a* and 105*b*, the drip plate 180, and the bottom housing 110). The drive gear 165 contactingly engages a transfer gear 160 within a series of transfer gears 160 to transfer rotational motion of the shaft 170 to the transfer gears 160. Although three transfer gears 160 are illustrated in FIG. 1C, alternative embodiments may include more or fewer transfer gears 160. In some embodiments, one or more of the transfer gears 160 may be helical spur gears (e.g., helical gear 800).

As illustrated, one of the transfer gears 160 may be engaged with one or more of a plurality of idler gears 145 disposed across a width of the side housing 105. As illustrated, the idler gears 145 may be spaced evenly across the plenum plate 155. The roller grill 100 also includes heating tube gears 140 that are coupled (e.g., inserted into) to respective heating tubes 120. For example, as illustrated, there may be a 1:1 ratio of heating tube gears 140 and heating tubes 120. In some embodiments, one or more of the idler gears 145 and/or heating tube gears 140 may be helical spur gears (e.g., helical gear 800).

As illustrated, a cover plate 185*a* may be disposed in the plenum 102*a* and mounted to a top interior surface of the side housing 105. In some embodiments, the cover plate 185*a* may cover ends of the heating tube gears 140. In some embodiments, the cover plate 185*a* may be mounted adjacent a gear head portion of the heating tube gear 140 such that a concave portion extends into the gear head portion adjacent a beveled surface (e.g., as shown in FIG. 9B). In some embodiments, electrical wiring coupled to the respective heating elements 150*a* inserted through the heating tube 120 may be installed within a volume defined by the concave portion, thereby saving space within the plenum 102*a*.

The gears 140, 145, 160, and 165 may, in some embodiments, be spur gears. In some embodiments, the gears 140, 145, 160, and 165 may be helical spur gears. In some embodiments, the gears 140, 145, 160, and 165 may be non-metallic, such as, for example, a high-temperature plastic. In some embodiments, for example, one or more gears 140 may be a high-temperature plastic such as, for example, polystyrene, nylon, TEFLON™, polyethylene, polypropylene, polyvinyl chloride, polytetrafluoroethylene (PTFE), and other plastic material) that has a continual duty max temperature rating of between about 250° F. (121° C.) and about 500° F. (260° C.). In some embodiments, for example, one or more gears 145, 160, and/or 165 may be a high-temperature plastic that has a continual duty max temperature rating of between about 120° F. (49° C.) and about 200° F. (93° C.).

In some embodiments, the gears 140, 145, 160, and 165 (and other rollers described herein, such as gears 225 and 230 and pulleys 325*a*, 330*a*, as some examples) may be self-lubricating. For example, in some embodiments having non-metallic gears 140, 145, 160, and 165, a material that forms the gears 140, 145, 160, and 165 may be impregnated with or otherwise contain a lubricant material, such as, for example, silicon, or other lubricant material. During operation of the roller grill 100, the lubricant material may exude from one or more of the gears 140, 145, 160, and 165, thereby providing for decreased failure rates due to lack of lubricant between the gears 140, 145, 160, and 165 and other components (e.g., chains, belts, or other components).

Turning to FIG. 1E, a side view of a non-drive side of the roller grill 100 is illustrated. In some embodiments, only one side housing 105*a* may enclose (at least partially) one or more gears and other components of the direct drive assembly. In alternative embodiments, both side housings 105*a* and 105*b* may enclose (at least partially) a portion of one or more (e.g., two) direct drive assemblies as described above. For example, there may be two motors 175 with each motor 175 driving (e.g., rotating) half of a total number of heating tubes 120 via independent direct drive assemblies. Each independent direct drive assembly may be enclosed within separate side housings 105*a* and 105*b*.

As illustrated, one of the plenums 102*b* enclosed by the side housing 105*b* (shown in FIG. 1E) is substantially free of gears and other direct drive assembly components. As illustrated, the heating tube 120 may include heating element 150*b* extending from this end of the tube 120 and may extend through the side housing 105*b* and be secured to the side housing 105*b* by a bushing 135*b* (as described above). The bushing 135*b* may be sandwiched against an interior surface of the side housing 105*b* by a retainer plate 190*b* (as described above). In the illustrated embodiment, a cover plate 185*b* is mounted to the side housing 105*b* and adjacent the bushing 135*b*. In some embodiments, a bearing 197 may be mounted between the bushing 135*b* and the retainer plate 190*b* so as to, for example, provide a bearing (e.g., wear) surface between the bushing 135*b* and the retainer plate 190*b*.

In operation, the motor 175 of the roller grill 100 may rotate the shaft 170, which in turn rotates the drive gear 165. The drive gear 165, in turn, transfers rotational movement to the transfer gears 160. One of the transfer gears 160 is engaged with one or more of the idler gears 145 such that rotational movement is transferred from the transfer gears 160 to the engaged idler gear 145. The engaged idler gear 145 is also in contacting engagement with at least one of the heating tube gears 140, and transfers rotational movement to the at least one heating tube gear 140. Rotational movement is thus transferred to each of the idler gears 145 and heating tube gears 140, thereby rotating the heating tubes 120.

Figure 2B:
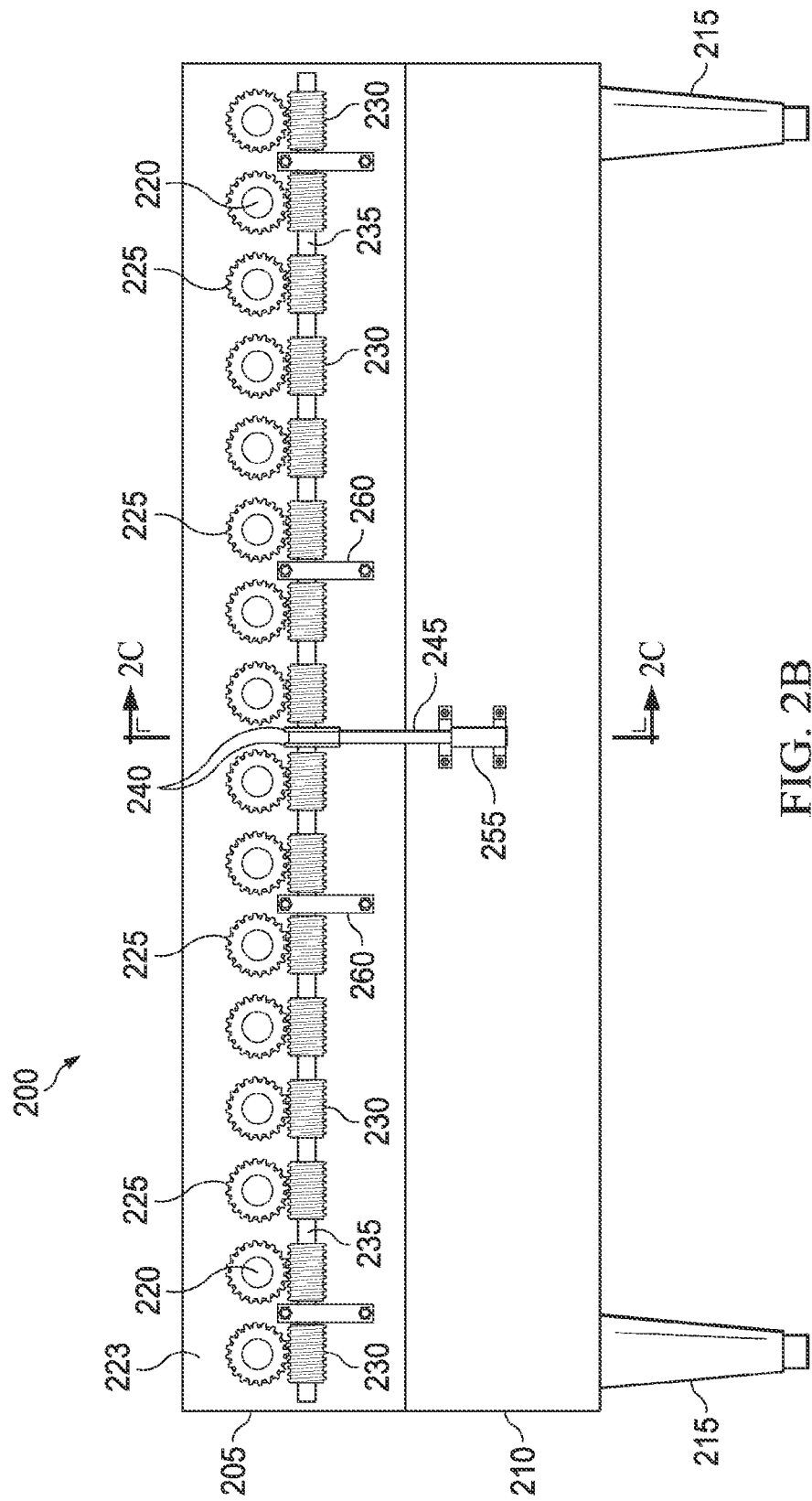

FIGS. 2A-2D illustrate views of an example embodiment of a roller grill 200 including a belt drive assembly including one or more worm gears. FIG. 2A shows that the roller grill 200 includes a side housing 205 and a bottom housing 210 that is attached to and disposed between lower regions of plates of the side housing 205 and a corresponding side housing on an opposite end of the roller grill 200 (not shown). Referring now to FIG. 2B, the weight of the roller grill 200 is supported by multiple legs 215 that are mounted underneath and near corners of the bottom housing 210.

FIGS. 2A-2B illustrate the roller grill 200 further including multiple heating tubes 220 that are disposed parallel to one another, across a volume defined between upper regions of opposite panels of the two side housings 205, and above the bottom housing 210. An end of each heating tube 220 extends through a respective hole within the panel of the side housing 205 into a plenum space 223 provided by the side housing 205. In some embodiments, the width of the plenum space 223 is approximately 1.625 inches (4.128 cm). Within the plenum space 223, each heating tube 220 and is engaged with a respective spur gear 225 included within the belt drive assembly. In some examples, each spur gear 225 is mounted in the end of the respective heating tube 220 and is maintained on the end by a respective bushing 250 and/or other components. In some examples, the spur gears 225 may be helical spur gears. Within the plenum space 223, the spur gears 225 are further engaged with worm gears 230 disposed adjacent (e.g., beneath) the spur gears 225 and mounted on a shaft 235 that extends along at least a portion of the width of the roller grill 200.

In some embodiments, the ratio of spur gears 225 to worm gears 230 is 1:1. In some embodiments, the ratio of spur gears 225 to worm gears 230 is 2:1 or another ratio. In some embodiments, a spur gear 225 may be a helical spur gear. In some embodiments, a worm gear 230 may be a screw worm gear. In some embodiments, the shaft 235 may be coupled to the side housing 205 by one or more bearing blocks 260.

FIG. 2C illustrates that the shaft 235 is further coupled to a timing pulley 240 having multiple teeth disposed on a cylindrical surface that engage multiple teeth protruding from a surface of a timing belt 245. The timing belt 245 sequentially engages multiple components of the belt drive assembly that may be fully or partially disposed within the bottom housing 210 of the roller grill 200. For example, such components include, as illustrated, a first pulley 255, a timing gear 270 having multiple teeth disposed on a circumferential surface and mounted on a shaft of a motor 265, and a second pulley 275 disposed vertically higher than the first pulley 255. In some examples, one or both of the pulleys 255 or 275 can be a timing pulley (i.e., with a grooved circumferential surface). In some examples, one or both of the pulleys 255 or 275 may have substantially smooth outer cylindrical surfaces.

During operation of the roller grill 200, the motor 265 generates rotary motion of the heating tubes 220 by using the timing belt 245 to transfer rotary motion to the worm gears 230 engaged with the spur gears 225. Power generated by the motor 265 drives rotation of the timing gear 270 mounted on the shaft of the motor 265, which, by engagement of the teeth disposed on the surface of the timing gear 270 with the teeth protruding from the surface of the timing belt 245, drives rotation of the timing belt 245. Thus, in the illustrated embodiment, the timing belt 245 extends from the bottom housing 210 through the panel of the side housing 205 and into the plenum space 223 provided by the side housing 205 to engage the timing pulley 240. Alternatively, the motor 265 may be mounted elsewhere in or on the roller grill 200 (e.g., in the plenum space 223 or otherwise).

Engagement of the teeth protruding from the surface of the timing belt 245 with teeth disposed on the surface of the timing pulley 240 drives rotation of the timing pulley 240, which in turn rotates the shaft 235. Rotary motion of the shaft 235 drives rotation of the worm gears 230, which consequently drives rotation of the spur gears 225 due to their engagement with the worm gears 230, and further drives rotation of the heating tubes 220 that are coupled to the spur gears 225.

In some embodiments, one motor 265 may be coupled to two belt drive assemblies located at opposing sides of the roller grill 200. In some embodiments, a first motor 265 may be coupled to a first belt drive assembly located at a first side of the roller grill 200, while a second motor 265 may be coupled to a second belt drive assembly located at a second side of the roller grill 200. In other embodiments, there may be two (or more) belt drive assemblies, with each assembly driving a subset of a total number of heating tubes 220 of the roller grill 200. Each belt drive assembly may drive the corresponding subset of heating tubes 220 from the same end of the roller grill 200 or from opposed ends.

Referring now to FIG. 2D, in some embodiments, a cover plate 280 may be attached to the side housing 205, such that the cover plate 280 is adjacent to the spur gears 225 and the worm gears 230. The cover plate 280 is disposed to cover various components of the drive assembly (i.e., spur gears 225, worm gears 230, and other components) and is visible when the side housing 205 is displaced from the roller grill 200. The cover plate 280 may further serve as a heat sink that absorbs heat radiated from the heating tubes 220 and/or the drive assembly components, thereby transferring heat away from the drive assembly components and transferring heat to, for example, the plenum space 223 provided the side housing 205 or an ambient space exterior to the roller grill 200.

Figure 3A:
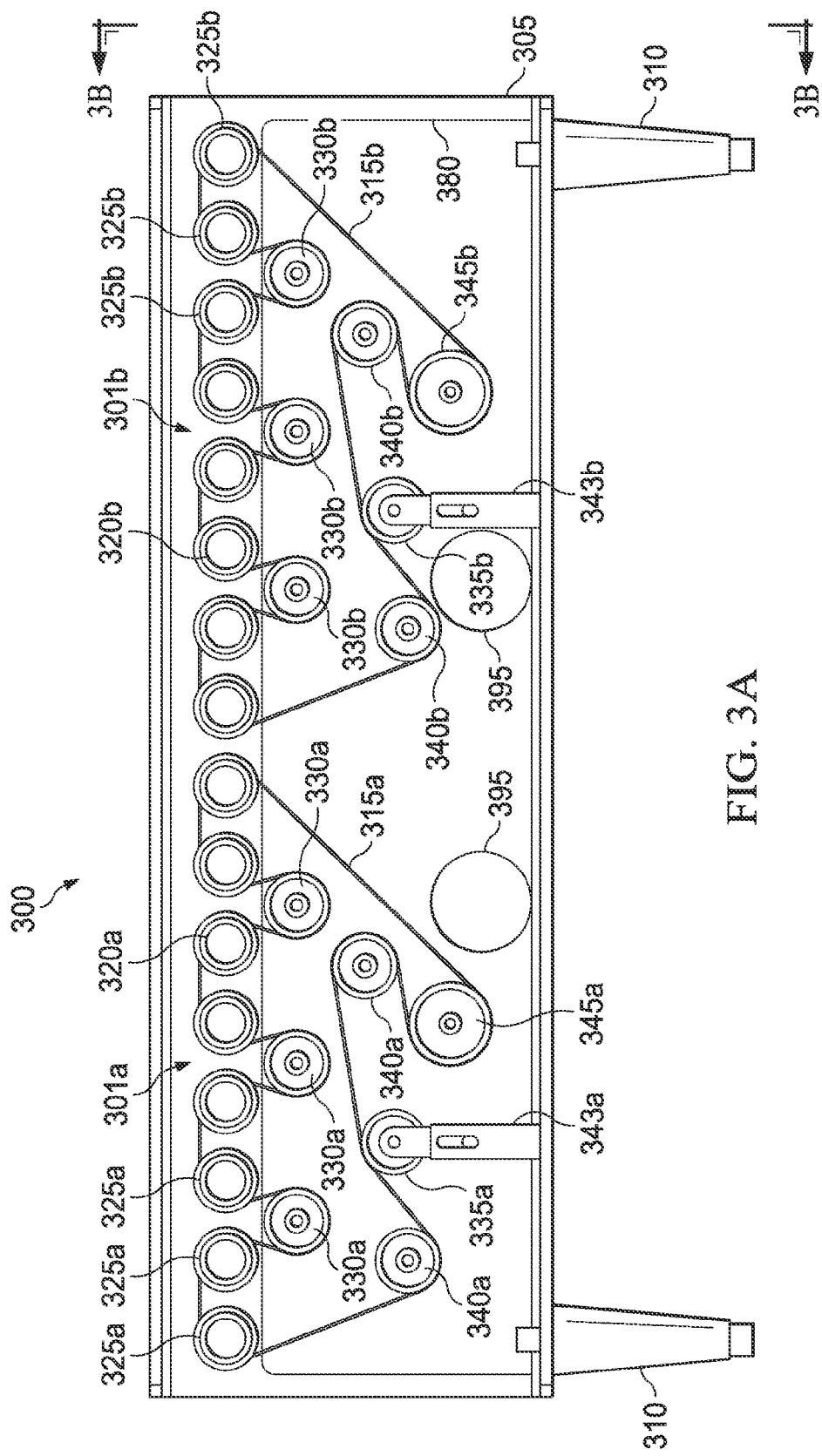
FIGS. 3A-3B illustrate views of another example embodiment of a roller grill utilizing a belt drive assembly in accordance with the present disclosure.
Figure 3B:
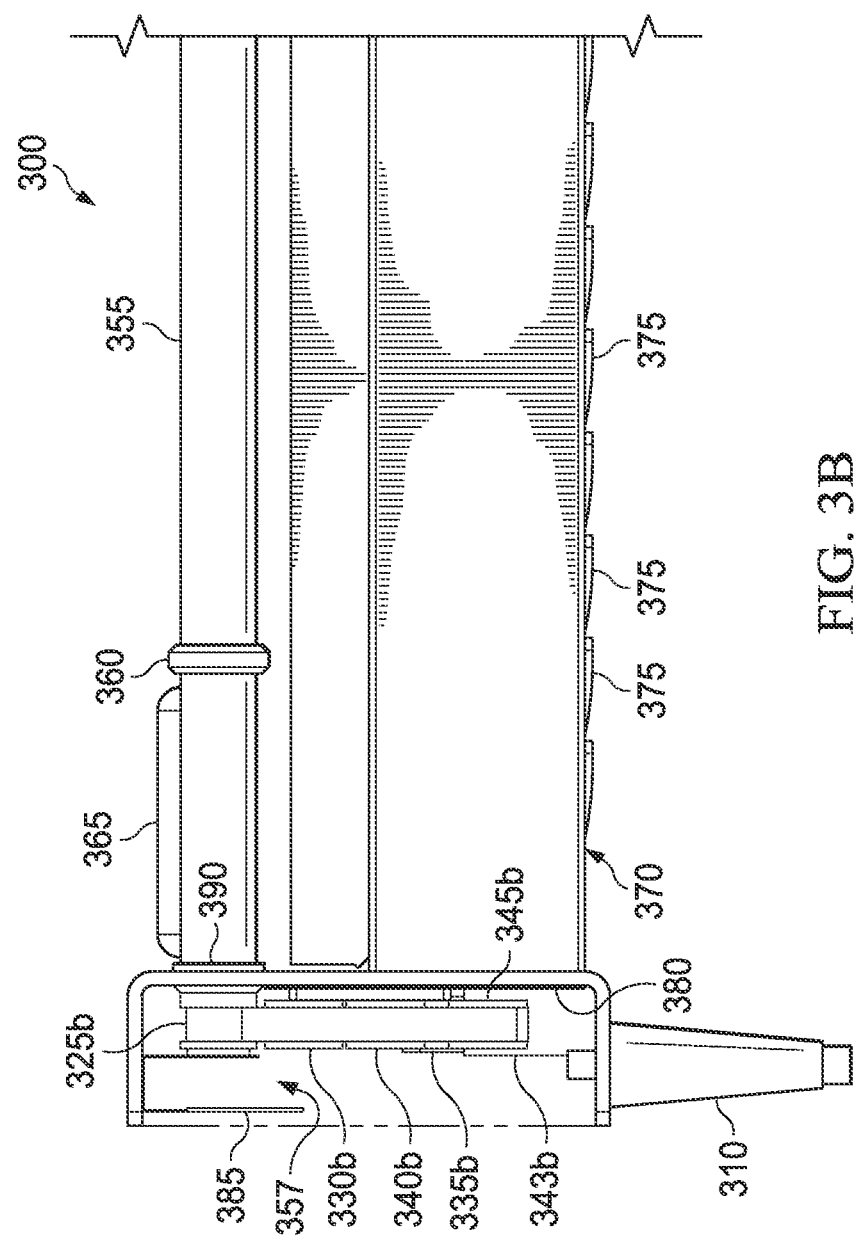

FIGS. 3A-3B illustrate views of another example embodiment of a roller grill 300 utilizing a belt drive assembly. The roller grill 300 includes a side housing 305 and a bottom housing 370 that is attached to and disposed between lower regions of panels of the side housing 305 and a corresponding side housing on an opposite end of the roller grill 300 (not shown). The weight of the roller grill 300 is supported by multiple legs 310 that are mounted underneath and near ends of the bottom housing 370. The roller grill 300 further includes multiple heating tubes 355 that are disposed parallel to one another, across a defined volume between upper regions of opposite panels of the two side housings 305, and above the bottom housing 370. The heating tubes 355 are further positioned sufficiently close to one another so as to allow a pre-cooked food product 365 to simultaneously rest atop two adjacent heating tubes 355. One or more annular shaped dividers 360 may be mounted on each heating tube 355 in order to prevent contact between two pre-cooked food products 365 positioned along common heating tubes 355 or to restrict lateral movement of a pre-cooked food product 365 resting atop the heating tubes 355.

In some embodiments, an end of each heating tube 355 extends through a respective hole within the panel of the side housing 305 into a plenum space 357 provided by the side housing 305, where the heating tubes 355 are coupled to one or more belt drive assemblies. In this example, the roller grill 300 includes two belt drive assemblies, a first belt drive assembly 301a and a second belt drive assembly 301b. In alternative embodiments, however, the roller grill 300 may include only one belt drive assembly or multiple (e.g., two or more) belt drive assemblies. The first belt drive assembly 301a includes, as illustrated, a timing belt 315a, multiple timing pulleys 325a, multiple upper idler pulleys 330a, two lower idler pulleys 340a, a tensioning pulley 335a, and a timing gear 345a. However, in alternative embodiments, the first belt drive assembly 301a may include more or fewer of these listed components. The second belt drive assembly 301b includes, as illustrated, a timing belt 315b, multiple timing pulleys 325b, multiple upper idler pulleys 330b, two lower idler pulleys 340b, a tensioning pulley 335b, and a timing gear 345b. However, in alternative embodiments, the second belt drive assembly 301b may include more or fewer of these listed components.

In the illustrated embodiment, the timing belts 315a and 315b include teeth protruding from a circumferential surface that are adapted to engage teeth disposed on a surface of one or more corresponding timing pulleys 325a, 325b. The timing belts 315a and 315b are secured on the one or more corresponding timing pulleys 325a and 325b by one or more bushings 320a and 320b. Alternatively, one or both of the timing belts 315a and 315b may be smooth belts, with no teeth or other protrusions on a circumferential surface.

In some embodiments, the teeth protruding from a first surface of the timing belt 315a, 315b engage the teeth disposed on the surface of one or more timing pulleys 325a, 325b alternate with a second surface of the timing belt 315a, 315b engaging one or more upper idler pulleys 330a, 330b. Following engagement of the timing belt 315a, 315b with the one or more timing pulleys 325a, 325b and the one or more upper idler pulleys 330a, 330b, the teeth protruding from the surface of the timing belt 315a, 315b engage teeth disposed on a surface of a tensioning pulley 335a, 335b, which may be mounted on a vertically adjustable, spring-loaded bracket assembly 343a, 343b. The bracket assembly 343a, 343b allows the tensioning pulley 335a, 335b to be adjusted vertically, thereby further allowing adjustment of tension in the timing belt 315a, 315b. In some embodiments, the roller grill 300 may not include the tensioning pulley 335a, 335b and the bracket assembly 343a, 343b.

In some embodiments, the belt drive assemblies 301a and 301b can include one or more lower idler pulleys 340a, 340b. Following engagement of the teeth protruding from the surface of the timing belt 315a, 315b with the teeth disposed on the surface of the tensioning pulley 335a, 335b, the teeth protruding from the surface of the timing belt 315a, 315b engage teeth disposed on the surface of the timing gear 345a, 345b. The timing gear 345a, 345b may be coupled to a motor (not shown) located in the bottom housing 370 of the roller grill 300 that drives rotary motion of the timing belt 315a, 315b.

In some embodiments, one or more of the upper idler pulleys 330a, 330b may be coupled to a plenum plate 350, which can serve as a heat sink that transfers heat away from the timing belt 315a, 315b and timing pulleys 325a, 325b.

In some embodiments, a louver 375 may be disposed along the bottom surface of the bottom housing 370, allowing cool air to pass into the bottom housing 370 and cool the motor and any other drive components disposed within the bottom housing.

Referring now to FIG. 3B, in some embodiments, a plenum plate 380 may be attached to each side housing 305. Various components of the drive assembly, such as, for example, the timing gears 345a and 345b, the idler pulleys 340a and 340b, and other components, may be mounted on (e.g., via mechanical fasteners) on the plenum plate 380. The plenum plate 380 may further serve as a heat transfer surface that absorbs heat radiated from the heating tubes 355 and the drive assembly components, thereby transferring heat away from the drive assembly components. In some embodiments, the plenum plate 380 may include one or more ventilation holes 395 allowing fluid (e.g., airflow) communication between the plenum 357 and a volume defined underneath the heating tubes 355 and within the bottom housing 210. Such airflow may also be communicated through the louvers 375. The roller grill 300 may also include multiple bushings 390 that are respectively mounted over the ends of the multiple heating tubes 355 and that, for example, prevent the timing pulleys 325a, 325b from moving inward on the multiple heating tubes 355. Further, the bushings 390, which may be similar to, for instance, the bushing 900 shown in FIG. 9A, may provide a bearing surface for the heating tubes 355 to rotate within during operation of the roller grill 300. In some examples, the plenum plate 380 may have a thermal conductivity that is greater than or equal to 200 Btu/(hrft° F.) (346 W/(mK)) at a temperature of 250° F. (121° C.).

During operation of the roller grill 300, one or more motors (located within the bottom housing 370, not shown in FIGS. 3A-3B) drive rotation of the heating tubes 355 via the belt drive assemblies 301a, 301b. In some embodiments, a single motor may drive both belt drive assemblies 301a, 301b. In other embodiments, each belt drive assembly 301a, 301b (and other belt drive assemblies), may each be driven by a dedicated motor.

Power generated by the motor drives rotation of the timing gear 345a, 345b mounted on a shaft (not shown in FIGS. 3A-3B) of the motor, which, by engagement of the teeth protruding from the surface of the timing belt 315a, 315b with teeth disposed on the surface of the timing gear 345a, 345b, drives rotary motion of the timing belt 315a, 315b. Engagement of teeth protruding from the surface of the timing belt 315a, 315b with teeth disposed on the surface of the timing pulleys 325a, 325b further provides rotary motion to the timing pulleys 325a, 325b, which consequently rotate the heating tubes 355. Engagement of the teeth protruding from the timing belt 315a, 315b with teeth and surface of the timing belt 315a, 315b disposed on the surface of the idler pulleys 330a, 330b, 340a, 340b and the tensioning pulley 335a, 335b, further rotates the idler pulleys 330a, 330b, 340a, 340b and the tensioning pulley 335a, 335b, respectively.

In some embodiments, the arrangement of the timing pulleys 325a, 325b and one or more of the idler pulleys 330a, 330b, 340a, 340b, the tensioning pulley 335a, 335b, and the timing gear 345a, 345b creates a series of alternating timing belt heating cycles and timing belt cooling cycles, respectively. In some embodiments, the timing belt heating cycles are provided by heat radiated from the timing pulleys 325a, 325b. When heat is generated within the heating tubes 355 by, for example, electric resistive heating elements, the heat is transferred to various components of the roller grill assembly 300, including the bushings 390 and the timing pulleys 325a, 325b. As the timing belt 315a, 315b engages with the timing pulleys 325a, 325b, the timing belt 315a, 315b absorbs heat from the timing pulleys 325a, 325b (i.e., the timing pulleys 325a, 325b transfer heat to the timing belt 315a, 315b).

In some embodiments, the timing belt 315a, 315b may be made from low heat conducting material. For example, the timing belt 315a, 315b may be insulated from the transfer of heat from, for instance, the heating tubes 355 through the timing pulleys 325a, 325b.

In some embodiments, the timing belt cooling cycles are provided by heat absorbed by one or more of the idler pulleys 330a, 330b, 340a, 340b, the tensioning pulley 335a, 335b, and the timing gear 345a, 345b. For example, as the timing belt 315a, 315b engages with the idler pulleys 330a, 330b, 340a, 340b, the idler pulleys 330a, 330b, 340a, 340b absorb heat from the timing belt 315a, 315b (i.e., the idler pulleys 330a, 330b, 340a, 340b transfer heat away from the timing belt 315a, 315b). In some embodiments, the roller grill 300 may not include the lower idler pulleys 340a, 340b or the tensioning pulley 335a, 335b. Thus, in some embodiments, the presence of one or more of the idler pulleys 330a, 330b, 340a, 340b and the tensioning pulley 335a, 335b may determine the length and total cooling effect of the cooling cycle.

In some examples, the thermal conductivity of the timing pulleys 325a, 325b is less than that of one or more of the idler pulleys 330a, 330b, 340a, 340b, the tensioning pulley 335a, 335b, and the timing gear 345a, 345b. For example, in some embodiments, the thermal conductivity of the timing pulleys 325a, 325b may be less than or equal to 17 Btu/(hrft° F.) (29 W/(mK)) at a temperature of 250° F. (121° C.), while the thermal conductivity of one or more of the idler pulleys 330a, 330b, 340a, 340b, the tensioning pulley 335a, 335b, and the timing gear 345a, 345b may be greater than or equal to 200 Btu/(hrft° F.) (346 W/(mK)) at a temperature of 250° F. (121° C.). In some instances, the cooling cycle can drop the temperature of the timing belt 315a, 315b by up to 50° F. (10° C.). In some examples, the alternating heating cycles and cooling cycles may extend the life of the timing belt 315a, 315b. For example, the cooling cycle may provide the timing belt 315a, 315b with a life of up to six years, whereas a drive chain, in contrast, may need to be changed once per year.

In some embodiments, the timing pulleys 325a, 325b may be a low heat conductive material, such as plastic. In some embodiments, the idler pulleys 330a, 330b may be a high heat conductive material, such as aluminum. In some embodiments, the idler pulleys 340a, 340b may be a low heat conductive material, such as plastic. In some embodiments, the timing gear 345a, 345b may be a high heat conductive material, such as aluminum.

Figure 4B:
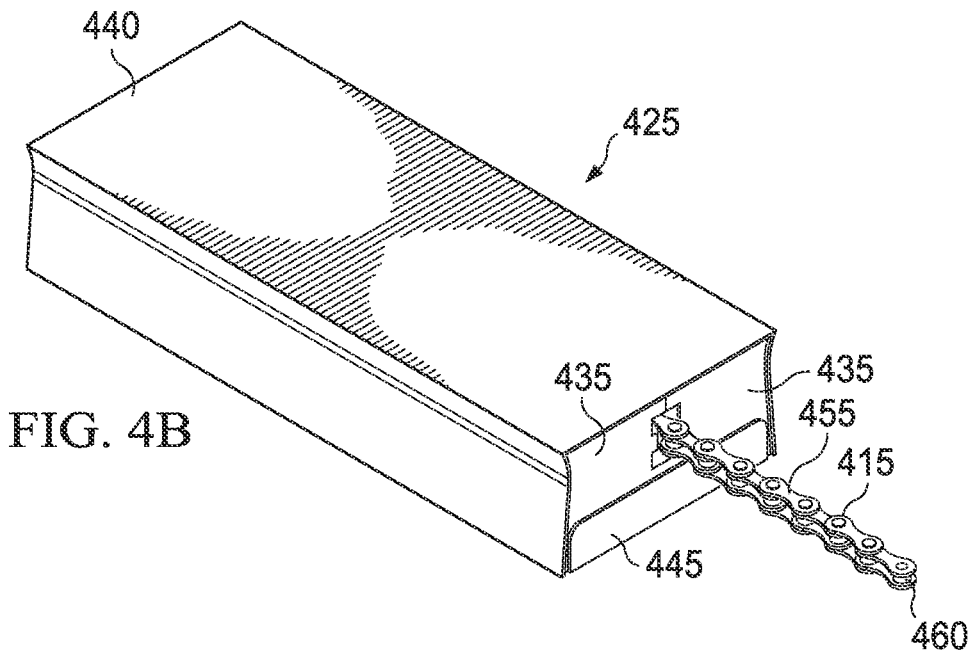
Figure 4C:
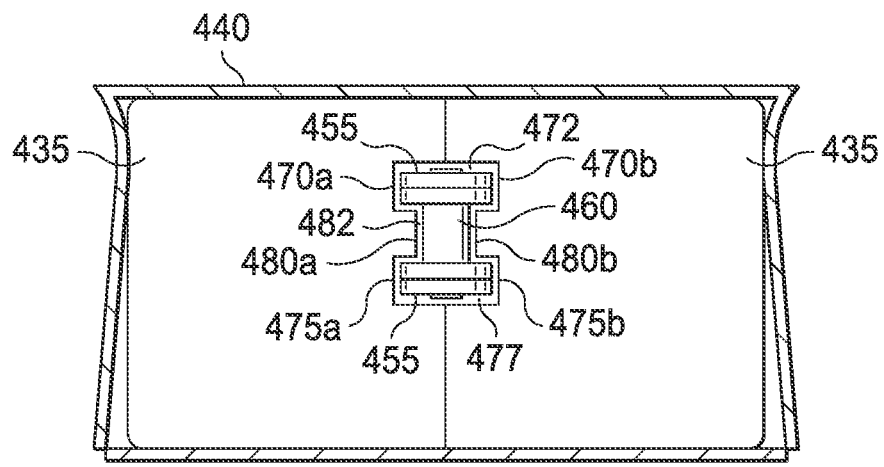

FIGS. 4A-4C illustrate views of another example embodiment of a roller grill 400 utilizing a chain drive assembly. The roller grill 400 includes two side housings 405 (one shown in FIG. 4A), and the weight of the roller grill 400 is supported by multiple legs 410 that are mounted underneath and near corners of a bottom housing. The roller grill 400 also includes multiple heating tubes and multiple sprockets 420 that are respectively coupled to ends of the multiple heating tubes. In some embodiments, a chain 415 provides rotary motion to the heating tubes by engaging the sprockets 420. The chain 415 is driven by one or more motors within a bottom housing of the roller grill 400 (not shown in FIGS. 4A-4B) as the chain 415 engages a drive gear 430 coupled to the motor. In this example, the roller grill 400 includes one chain drive assembly; however, in alternative embodiments, the roller grill 400 may include more than one chain drive assembly.

In some embodiments, one motor may be coupled to two chain drive assemblies located at opposing sides of the roller grill 400. In some embodiments, a first motor may be coupled to a first chain drive assembly located at a first side of the roller grill 400, while a second motor may be coupled to a second chain drive assembly located at a second side of the roller grill 400.

In some embodiments, a lubricator 425 may be attached to the side housing 405 and disposed around the chain 415 as the chain 415 travels through the drive assembly. In some examples, the lubricator 425 may be unattached to the side housing 405 and mounted on the chain 415. In this example, the lubricator 425 can have pins 450 disposed adjacent external surfaces of the lubricator 425 (e.g., protruding from the housing 405) that prevent the lubricator 425 from moving past a fixed distance from the drive sprocket 430. The lubricator 425, therefore, may be free-floating on the chain 415 (e.g., unattached to the side housing 405) and substantially prevented from moving with movement of the chain 415 towards the drive sprocket 430.

In some embodiments, the lubricator 425 may be approximately 4 inches (10 cm) long in length. The lubricator 425 includes two lubricant blocks 435, a shell cover plate 440, and a clam shell cover plate 445. Each lubricant block 435 has two grooves cut into a surface of the lubricant block 435, the surface of each lubricant block 435 disposed adjacent to and facing the mirrored surface of the other lubricant block 435. In some examples, when the surfaces of the two lubricant blocks 435 are disposed adjacent to and facing each other, the opening created by the grooves allows the plates 455 and rollers 460 of the chain 415 to travel through the lubricator 425 with engaging contact with the lubricant blocks 435.

Each lubricant block 435 is further impregnated with lubricant. In some embodiments, the lubricator 425 cleans and lubricates the chain 415 substantially constantly such that an appropriate amount of lubricant is provided to the chain 415, while excess lubricant on the chain 415 is removed. For example, the lubricator 425 can replace lubricant that may have evaporated from the chain 415 over time due to heat transferred to the chain 415, and/or the lubricator 425 can remove lubricant that may have congealed on the chain 415 over time. As the chain 415 enters the lubricant blocks 435 during operation of the roller grill 400, excess lubricant on the chain 415 is scraped away (e.g., by external edges of the lubricant blocks 435, the "T"-shaped recess defined between the lubricant blocks 435, or other edge surface). As the chain 415 continues to pass through and in contact with the facing surfaces of the lubricant blocks 435, lubricant impregnated in the lubricant blocks 435 is disposed on the chain 415. The clam shell cover plate 440, in some embodiments, can serve as a spring that urges the two lubricant blocks 435 together to maintain their contact. Further, the shell cover plate 440 may maintain the lubricant blocks 435 disposed around the chain 415 as the chain 415 travels through the lubricator 425.

In some embodiments, the lubricator 425 can be used with any chain-driven system that needs regular lubrication maintenance to function properly. For example, the lubricator 425 may be used on a bicycle chain, a motorcycle chain, a food heating assembly chain, or otherwise. Further, although the lubricant blocks 435 are illustrated as separate portions, in some embodiments, the lubricator 425 may have a single lubricant block with one or more of the illustrated channels and/or grooves formed therethrough.

FIG. 4C illustrates a sectional view of the lubricator 425. As illustrated, the lubricant blocks 435 are urged together by the shell cover plate 440 to form an interface at matching surfaces of the blocks 435. Upon interface of the lubricant blocks 435, grooves 470a and 470b define a channel 472. In some embodiments, the channel 472 may extend an entire length of the blocks 435 with openings at each end surface of the lubricant blocks 435. As illustrated, a portion of the chain 415, such as, for example, a plate 455 of the chain 415, may fit within the channel 472. In some embodiments, the channel 472 may be sized so as to contactingly engage the portion of the chain 415 (e.g., the plates 455) as the chain 415 is moved through the lubricator 425. In such a fashion, lubricant impregnated into the lubricant blocks 435 may be transferred to the chain 415.

As illustrated, upon interface of the lubricant blocks 435, grooves 475a and 475b define another channel 477. In some embodiments, the channel 477 may extend the entire length of the blocks 435 with openings at each end surface of the lubricant blocks 435. As with the channel 472, the channel 477 may be sized so as to contactingly engage the portion of the chain 415 (e.g., the plates 455) as the chain 415 is moved through the lubricator 425. In such a fashion, lubricant impregnated into the lubricant blocks 435 may be transferred to the chain 415 in cooperation with the channel 477.

As illustrated, ridges 480a and 480b may be formed in the lubricant blocks 435 in between the grooves 470a and 475a, and grooves 470b and 475b, respectively. The ridges 480a and 480b may be sized to allow a portion of the chain 415 (e.g., the rollers 460) to move through another channel 482 formed between the lubricant blocks 435. As illustrated, the channel 482 may be open to the channels 472 and 477, thereby defining a substantially "T" shaped opening through the lubricant blocks 435. In some embodiments, lubricant from the lubricant blocks 435 may be transferred to the rollers 460 as the chain 415 is moved through the lubricant blocks 435 through, for instance, contacting engagements with the ridges 480a and 480b.

In some embodiments, lubricant on the chain 415 may be removed by the lubricant blocks 435 as the chain 415 enters into and/or moves through the lubricant blocks 435. For instance, edges on distal surfaces of the lubricant blocks 435 that define openings into the channels 472 and 477 may remove excess and/or used lubricant from the chain 415 as the chain 415 is moved over, and in contact with, such edges. In some embodiments, excess and/or used lubricant may also be removed from the chain 415 as the portions of the chain 415 (e.g., the plates 455 and rollers 460) contactingly engage the lubricant blocks 435 at the grooves 470a, 470b, 475a, and 475b, and at the ridges 480a and 480b.

Figure 5A:
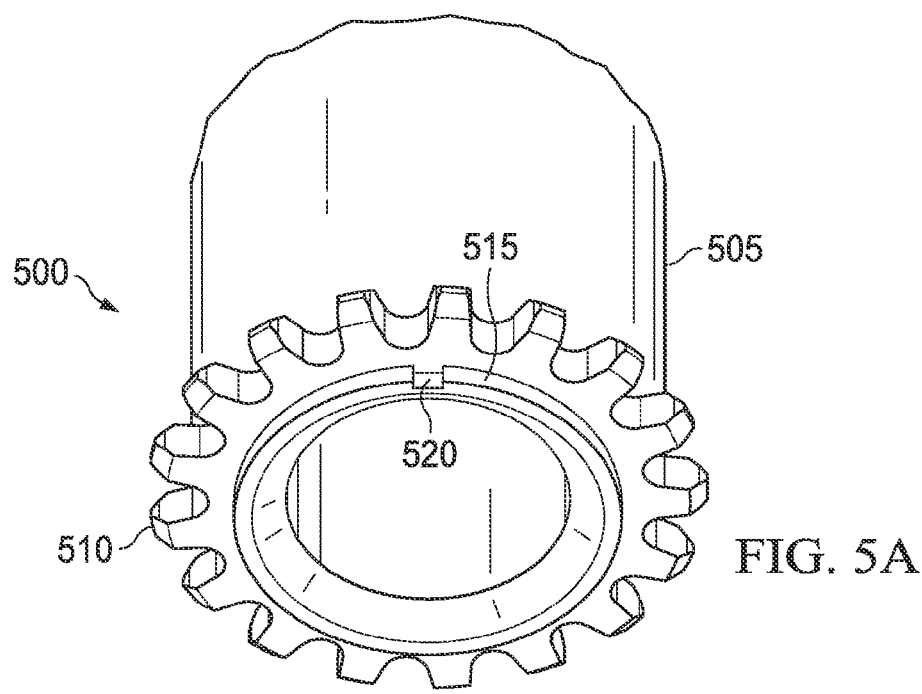
FIGS. 5A-5B illustrate views of example embodiments of a roller grill tube in accordance with the present disclosure.
Figure 5B:
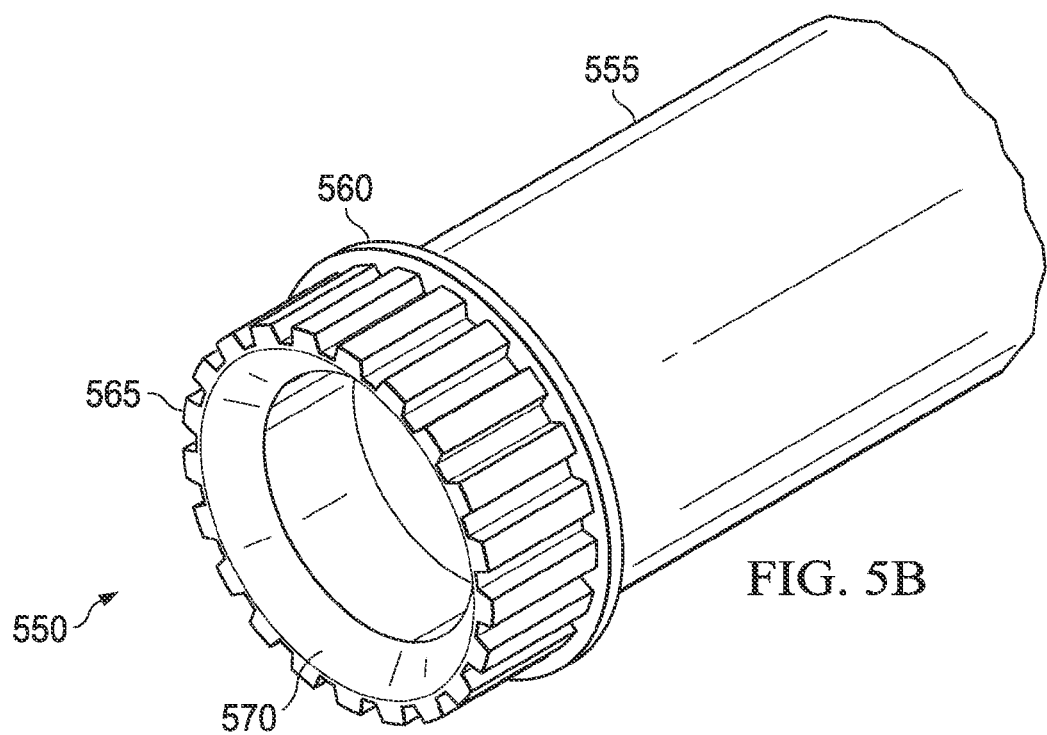

FIGS. 5A-5B illustrate views of example embodiments of a roller grill tube assembly 500, 550 that may be used with a roller grill, such as one or more of roller grills 100, 200, 300 and/or 400. Referring now to FIG. 5A, in some embodiments, a roller grill tube assembly 500 includes a heating tube 505, a sprocket 510 coupled to an end of the heating tube 505, and a bushing 515. In some embodiments, the sprocket 510 is installed over the heating tube 505 (e.g., press fit over the tube 505). In some embodiments, the bushing 515 may be a bearing inserted into the sprocket 510 that acts as a thrust bearing that prevents (all or partially) metal-to-metal contact between the sprocket 510 and other metal components of a roller grill.

In some examples, the sprocket 510 may allow the roller grill tube assembly 500 to operate with a roller grill utilizing a chain drive assembly, such as the roller grill 400. During operation of a roller grill, the bushing 515 provides a surface to transfer heat away from the heating tube 505 and the sprocket 510, thereby reducing the wear of the sprocket 510 and a chain (e.g., the chain 415) engaged with the sprocket 510. In some embodiments, the bushing 515 can include a notch 520 that engages with a ridge of the heating tube 505 or a ridge of the sprocket 510 to prevent or reduce slippage of the bushing 515. In some examples, the bushing 515 is a TEFLON™ bushing.

Referring now to FIG. 5B, in some embodiments, a roller grill assembly 550 may include a heating tube 555, a pulley flange 560 coupled to an end of the heating tube 555, a timing pulley 565 coupled to the end of the heating tube 555, and a bushing 570. The bushing 570 may, in some embodiments, extend past the timing pulley 565 to contact a retainer plate (not shown), such as, for instance, the cover plate 280. In some embodiments, the bushing 570 may be TEFLON™ or another bearing material. In some embodiments, the timing pulley 565 may allow the roller grill tube assembly 550 to operate with a roller grill utilizing a belt drive assembly, such as the roller grill 300. In some examples, the pulley flange 560 may prevent the timing pulley 565 from sliding inward on the heating tube 555. In some examples, the pulley flange 560 is made of plastic (e.g., TEFLON™) or steel (e.g., stainless or carbon).

Figure 6A:
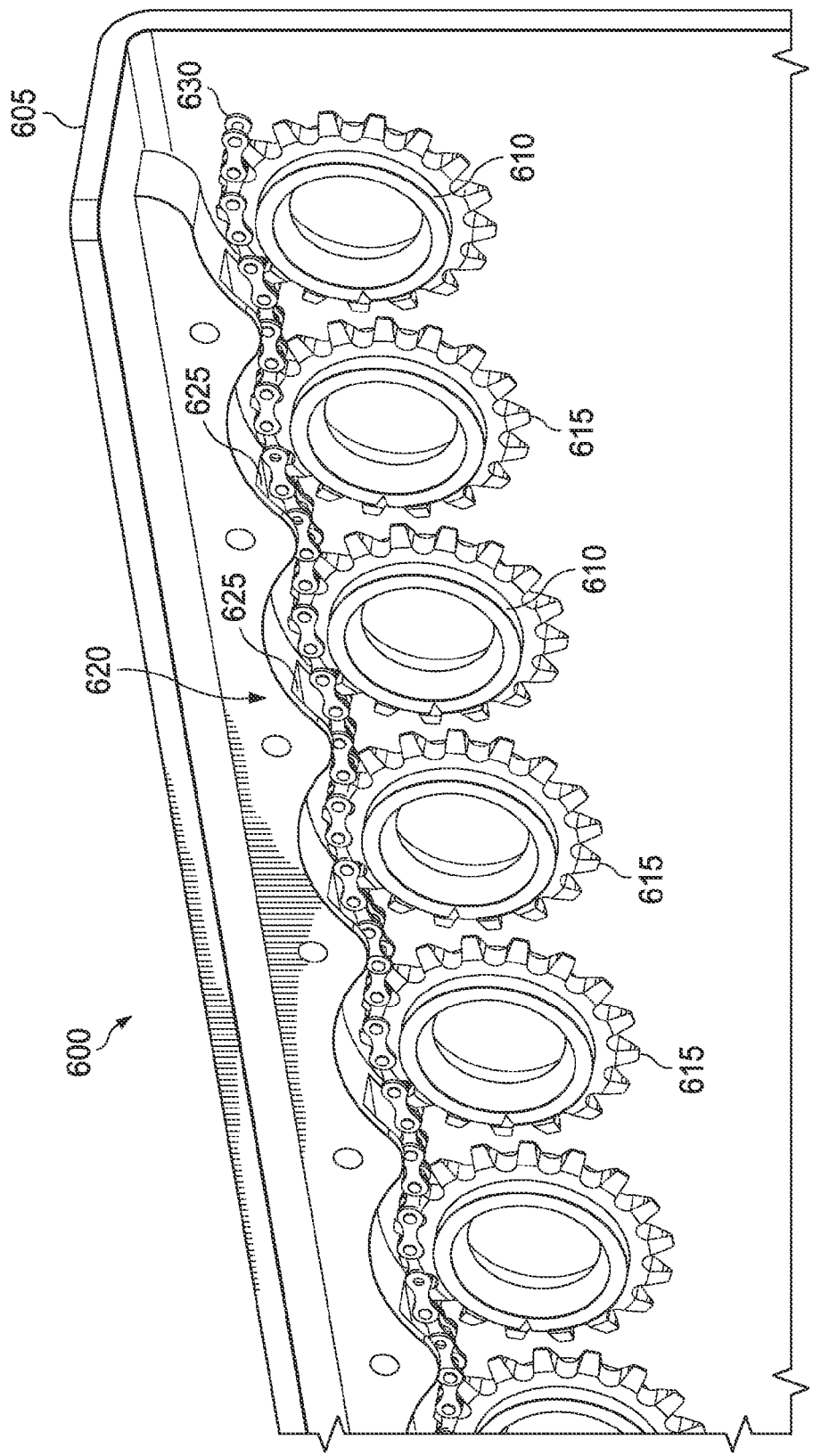

FIGS. 6A-6D illustrate views of example embodiments of a roller grill 600 having a chain drive assembly or a roller grill 600 having a belt drive assembly. As shown in FIG. 6A, the illustrated roller grill 600 includes a side housing 605, multiple heating tubes 610, and multiple sprockets 615 that are respectively coupled to ends of the multiple heating tubes 610. In some embodiments, as illustrated, a bearing (such as the bushing 515) may be press-fit into each heating tube 610 and provide a wear surface with a retainer plate (not shown) so as to prevent metal-to-metal contact with the sprockets 615 and, for instance, a retainer plate.

The roller grill 600 further includes a chain glide 620 having multiple glide recesses 625. In some embodiments, the chain glide 620 can be made of a bearing material, such as plastic, bronze, or other wearable material. In some embodiments, the chain glide 620 can have a serpentine shape that causes the chain 630 to engage more than one tooth of the sprockets 615. For example, the chain glide 620 may cause the chain 630 to engage with two or three teeth of the sprockets 615, rather than a single tooth in the absence of the chain glide 620.

Engagement of the chain 630 with more than one tooth of the sprockets 615 reduces the probability of the chain 630 being displaced from the sprockets 615. In some examples, engagement of the chain 630 with more than one tooth of the sprockets 615 reduces the frictional wear on any given point of the chain 630 and on any given tooth of the sprockets 615 by distributing forces between the chain 630 and the sprockets 615 across multiple teeth of the sprockets 615. In some embodiments, each of the glide recesses 625 may have side skirts that maintain the position of the chain 630 on the sprockets 615. In some examples, this can prevent damage of one or more of the chain 630, of the sprockets 615, or of other components of the chain drive assembly.

During operation of the roller grill 600, the chain 630 provides rotary motion to the heating tubes 610 by engaging the sprockets 615 that are coupled to the ends of the heating tubes 610. The chain 630 is driven by one or more motors within a bottom housing of the roller grill 600 (not shown in FIGS. 6A-6B) as the chain 630 engages a drive gear a coupled to the one or more motors. As the chain 630 engages the sprockets 615, the chain 630 is contacted and further guided towards the sprockets 615 by the chain glide 620, which causes the chain 630 to engage multiple teeth of the sprockets 615. While the chain 630 is engaged with the teeth of the sprockets 615, the glide recesses 625 can prevent the chain 630 from slipping off of the sprockets 615.

Figure 6B:
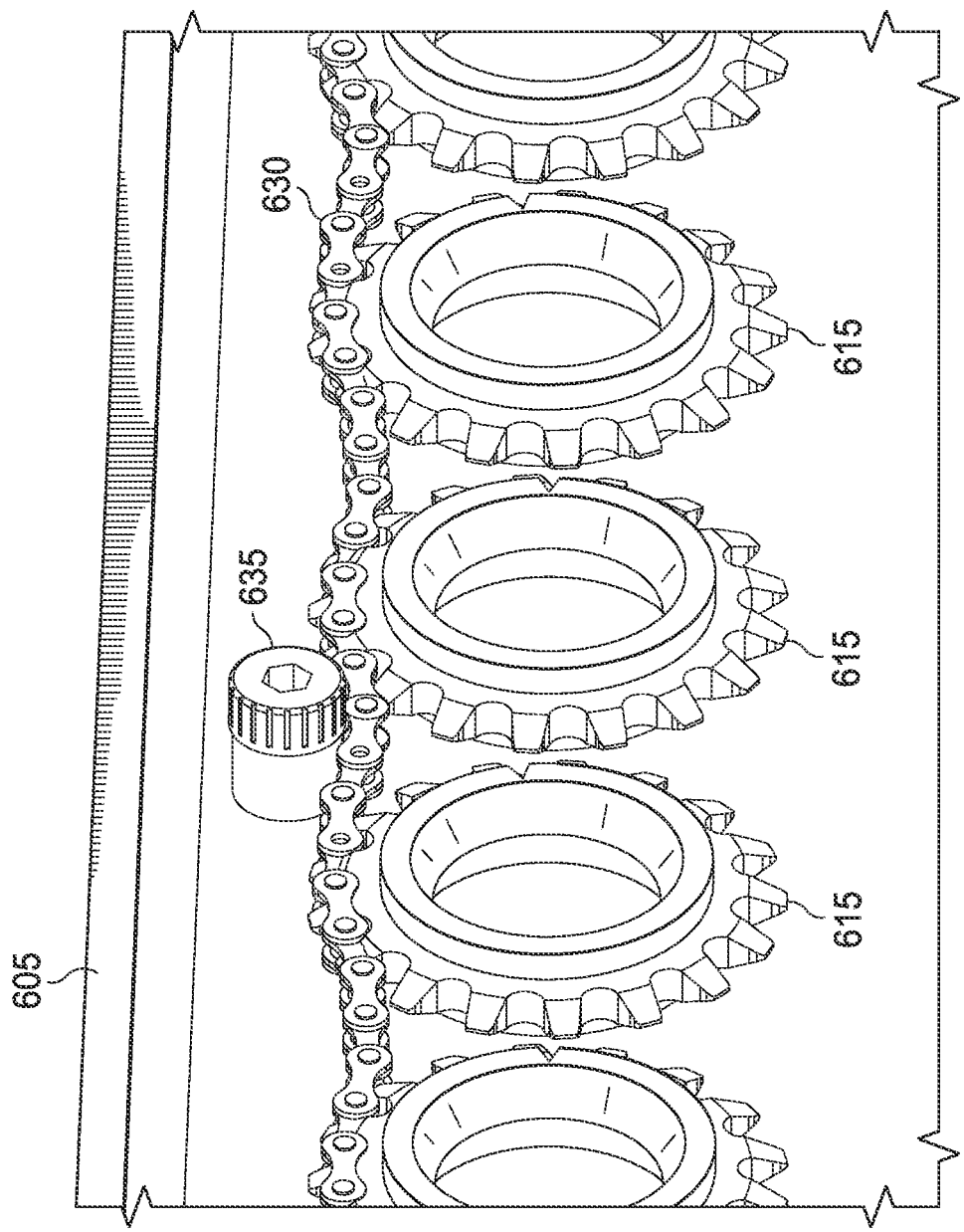

Referring now to FIG. 6B, in some embodiments, the roller grill 600 can include one or more rollers 635 coupled to the side housing 605 and disposed above and in contact with the chain 630 and between the sprockets 615. The one or more rollers 635 can cause the chain 630 to engage more than one tooth of the sprockets 615. In some embodiments, the position of the one or more rollers 635 can increase the engagement of the chain 630 with the teeth on two separate sprockets 615 simultaneously. In some examples, a roller 635 can be positioned above and in contact with the chain 630 and between every two sprockets 615. In some embodiments, the chain 630 may be longer than a conventional chain for a roller grill due to increased contact between the chain 630 and the teeth of the sprockets 615.

During operation of the roller grill 600, the chain 630 provides rotary motion to the heating tubes 610 by engaging the sprockets 615 that are coupled to the ends of the heating tubes 610. The chain 630 is driven by one or more motors within a bottom housing of the roller grill 600 (not shown in FIGS. 6A-6B) as the chain 630 engages a drive gear a coupled to the one or more motors. As the chain 630 engages the sprockets 615, the chain 630 is contacted and further guided towards the sprockets 615 by the rollers 635, which cause the chain 630 to simultaneously engage multiple teeth of adjacent sprockets 615. While the chain 630 is engaged with the teeth of the sprockets 615, the rollers 635 can also help in preventing the chain 630 from slipping off of the sprockets 615.

Figure 6C:
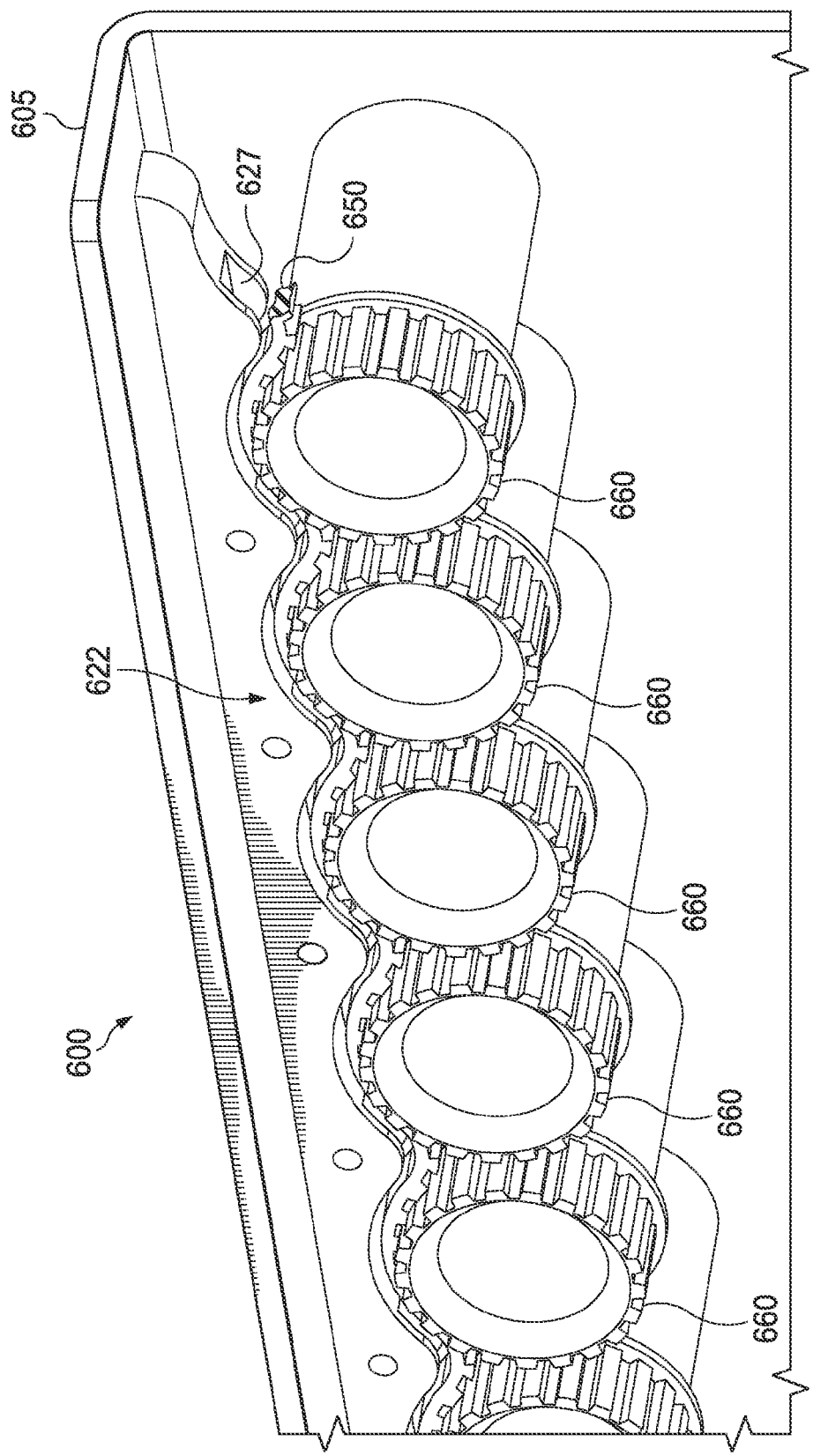

Turning to FIG. 6C, another embodiment of the roller grill 600 is shown but with a belt-drive assembly that uses a timing belt 650 engaged with gears 660 to drive (e.g., rotate) one or more heating tubes 610. This embodiment of the roller grill 600 further includes a belt glide 622 having multiple glide recesses 627. In some embodiments, the belt glide 620 can be made of a bearing material, such as plastic, bronze, or other wearable material. In some embodiments, the belt glide 622 can have a serpentine shape that causes the belt 650 to engage more than one tooth of the gears 660. For example, the belt glide 622 may cause the belt 650 to engage with two or three teeth of the gears 660, rather than a single tooth in the absence of the belt glide 622.

Engagement of the belt 650 with more than one tooth of the gears 660 reduces the probability of the belt 650 being displaced from the gears 660. In some examples, engagement of the belt 650 with more than one tooth of the gears 660 reduces the frictional wear on any given point of the belt 650 and on any given tooth of the gears 660 by distributing forces between the belt 650 and the gears 660 across multiple teeth of the gears 660. In some embodiments, each of the glide recesses 627 may have side skirts that maintain the position of the belt 650 on the gears 660. In some examples, this can prevent damage of one or more of the belt 650, of the gears 660, or of other components of the belt drive assembly.

During operation of this embodiments of the roller grill 600 shown in FIG. 6C, the belt 650 provides rotary motion to the heating tubes 610 by engaging the gears 660 that are coupled to the ends of the heating tubes 610. The belt 650 is driven by one or more motors within a bottom housing of the roller grill 600 (not shown in FIG. 6C) as the belt 650 engages a drive gear coupled to the one or more motors. As the belt 650 engages the gears 660, the belt 650 is contacted and further guided towards the gears 660 by the belt glide 622, which causes the belt 650 to engage multiple teeth of each of the gears 660. While the belt 650 is engaged with the teeth of the gears 660, the glide recesses 627 can prevent the belt 650 from slipping off of the gears 660.

Turning to FIG. 6D, another embodiment of the roller grill 600 is shown but with a belt-drive assembly that uses a timing belt 650 engaged with gears 660 to drive (e.g., rotate) one or more heating tubes 610. This embodiment of the roller grill 600 can include one or more rollers 637 coupled to the side housing 605 and disposed above and in contact with the belt 650 and between the sprockets 615. The one or more rollers 637 can cause the belt 650 to engage more than one tooth of the gears 660. In some embodiments, the position of the one or more rollers 637 can increase the engagement of the belt 650 with the teeth on two separate gears 660 simultaneously. In some examples, a roller 637 can be positioned above and in contact with the belt 650 and between every two gears 660. In some embodiments, the belt 650 may be longer than a conventional belt for a roller grill due to increased contact between the belt 650 and the teeth of the gears 660.

During operation of the roller grill 600, the belt 650 provides rotary motion to the heating tubes 610 by engaging the gears 660 that are coupled to the ends of the heating tubes 610. The belt 650 is driven by one or more motors within a bottom housing of the roller grill 600 (not shown in FIG. 6D) as the belt 650 engages a drive gear coupled to the one or more motors. As the belt 650 engages the gears 660, the belt 650 is contacted and further guided towards the gears 660 by the rollers 637, which cause the belt 650 to simultaneously engage multiple teeth of adjacent gears 660. While the belt 650 is engaged with the teeth of the gears 660, the rollers 637 can also help in preventing the belt 650 from slipping off of the gears 660.

Figure 7A:
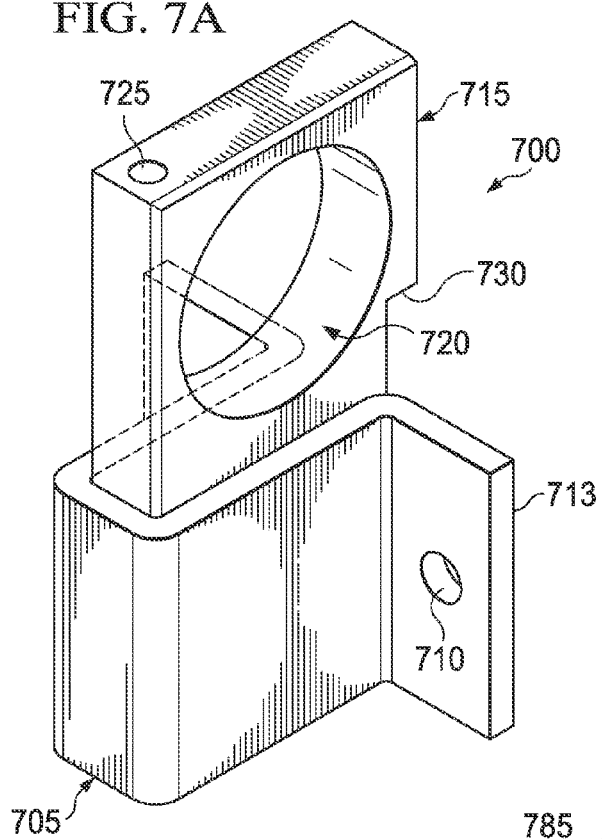
FIGS. 7A-7B illustrate example embodiments of a bearing block that may be used to support a rotating shaft of a roller grill according to the present disclosure.
Figure 7B:
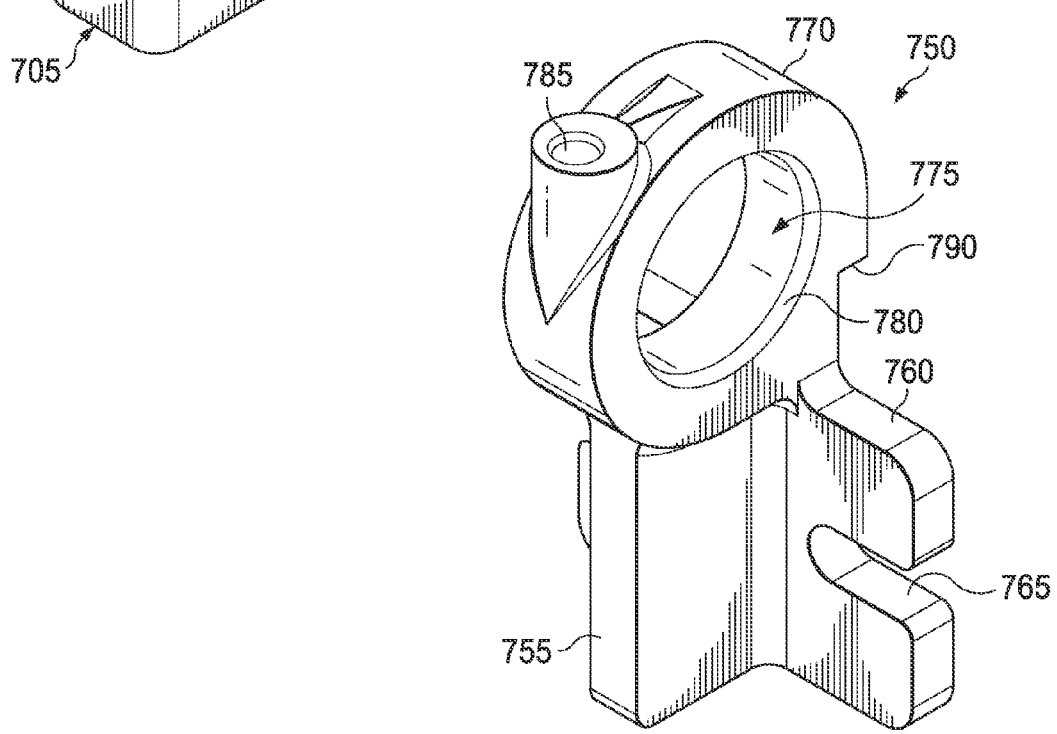

FIGS. 7A-7B illustrate example embodiments of a bearing block that may be used to support a rotating shaft of a roller grill, such as, for example, the roller grill 200 illustrated in FIGS. 2A-2D. For instance, in some embodiments, one or more of the illustrated bearing blocks 700 and/or 750 may be used to support (e.g., rotatingly) the shaft 235 on which the worm gears 230 are disposed. For example, in some embodiments, a bearing block 700 or a bearing block 750 may be mounted on the roller grill 200 at or near the illustrated locations of the illustrated bearing blocks 260 and may take the place of the bearing blocks 260. For instance, in some embodiments, there may be four bearing blocks 700 and/or 750 mounted and arranged to receive a bearing attached to the shaft 235 therethrough. Alternatively, there may be more or fewer bearing blocks 700 and/or 750 arranged on the roller grill 200 to receive the shaft 235 therethrough.

Turning to FIG. 7A, the illustrated bearing block 700 includes a vertical block 715 inserted through a yoke 705 and coupled thereto. In some embodiments, the vertical block 715 may be directly coupled to the yoke 705, such as, for example, by welding, adhesive, or other technique. A shaft with an attached bearing, such as the shaft 235, may be inserted through a bore 720 of the vertical block 715 and be supported (e.g., rotatingly) by a bearing (e.g., a roller bearing or other type of bearing) statically mounted within the bore 720 of the vertical block 715. Thus, in some embodiments, the shaft 235 may rotate with reduced friction in the bearing block 700. In some embodiments, the vertical block 715 may comprise a press fit bearing for the shaft 235 made of, for instance, stainless steel, cold rolled steel, or other appropriate material.

The yoke 705, as illustrated, includes two winged extensions 713, with each extension 713 having a mount hole 710 therethrough. In some embodiments, the yoke 705 may be directly coupled to the side housing 205 through mechanical fasteners (e.g., sheet metal screws or otherwise) inserted through the mount holes 710. In alternative embodiments, the yoke 705 may be directly coupled to a plenum plate, such as the plenum plate 350, through mechanical fasteners (e.g., sheet metal screws or otherwise) inserted through the mount holes 710.

As illustrated, the vertical block 715 includes a mounting ledge 730. In some embodiments, the mounting ledge 730 may interface with a portion of the roller grill 200, such as, for example, a plate on which the worm gears 230 may be mounted. In some embodiments, for example, the mounting ledge 730 may provide for an increased alignment of the bearing block 700 when mounted to the roller grill 200.

The illustrated bearing block 700 also includes a threaded bore 725. In some embodiments, a retainer or cover plate (such as the retainer plate 930 illustrated in FIG. 9B) may be attached to the bearing block 700 by a mechanical fastener threaded into the bore 725 and through a tab 940 of the retainer plate. This may, in some embodiments, provide or help provide for the bearing block 700 to be held substantially stationary during operation of the roller grill. For instance, the bearing block 700 may be held substantially stationary so that it does not rotate when the shaft 235 rotates and also is not urged laterally in parallel to the longitudinal axis of the shaft 235 due to thrust forces exerted by rotation of the worm gears 230.

Turning to FIG. 7B, the illustrated bearing block 750 includes a bearing ring 770 coupled to a yoke 755. In some embodiments, for example, the bearing ring 770 may be integral with the yoke 755, with each component manufactured of a metal or plastic, such as noryl (PPO) plastic (30% glass filled). A shaft, such as the shaft 235, may be inserted through a bore 775 of the bearing ring 770 and be supported (e.g., rotatingly) by a bearing (e.g., a roller bearing or other type of bearing) statically mounted within the bore 775 of the bearing ring 770. Thus, in some embodiments, the shaft 235 may rotate with reduced friction in the bearing block 750. In some embodiments, the bearing ring 770 may comprise a press fit bearing for the shaft 235 and may include a torque surface 780, as illustrated. In some embodiments, the torque surface 780 may prevent (all or partially) rotation of the bearing in the bore 775 during rotation of the shaft 235 within the bearing, as well as longitudinal movement of the bearing under a thrust force applied by the worm gears 230.

The yoke 755, as illustrated, includes two winged extensions 760, with each extension 760 having a mount slot 765 therethrough. In some embodiments, the yoke 755 may be directly coupled to the side housing 205 through mechanical fasteners (e.g., sheet metal screws or otherwise) inserted through the mount slots 765. In alternative embodiments, the yoke 755 may be directly coupled to a plenum plate, such as the plenum plate 350, through mechanical fasteners (e.g., sheet metal screws or otherwise) inserted through the mount slots 765.

As illustrated, the bearing ring 770 includes a mounting ledge 790. In some embodiments, the mounting ledge 790 may interface with a portion of the roller grill 200, such as, for example, a plate on which the worm gears 230 may be mounted. In some embodiments, for example, the mounting ledge 790 may provide for an increased alignment of the bearing block 750 when mounted to the roller grill 200 (e.g., a plenum plate).

The illustrated bearing block 750 also includes a threaded bore 785. In some embodiments, a retainer or cover plate (such as the retainer plate 930 illustrated in FIG. 9B) may be attached to the bearing block 750 by a mechanical fastener threaded into the bore 785 and through a tab 940 of the retainer plate. This may, in some embodiments, provide or help provide for the bearing block 750 to be held substantially stationary during operation of the roller grill. For instance, the bearing block 750 may be held substantially stationary so that it does not rotate when the shaft 235 rotates and also is not urged laterally in parallel to the longitudinal axis of the shaft 235 due to thrust forces exerted by rotation of the worm gears 230.

FIGS. 8A-8D illustrate an example helical gear 800 that may be used in a roller grill, such as, for example, the roller grill 200 illustrated in FIGS. 2A-2D. In some embodiments of the roller grill 200, for instance, the helical gear 800 may be coupled to a heating tube 220 (or other heating tube) and used to drive (e.g., rotate) the heating tube 220. For example, the helical gear 800 may be driven by the spur gear 225 and mounted on the shaft 235.

As illustrated, the helical gear 800 includes an outer diameter surface 810 coupled to (e.g., attached to or integral with) a gear head 805 having multiple teeth 815 disposed around an outer surface of the gear head 805. A bore 820 extends through the gear head 805 and outer diameter surface 810 and shares a centerline with the gear head 805 and the outer diameter surface 810. As illustrated, the teeth 815 may be angled to form a helical gear (e.g., at about a 5° angle offset). In some embodiments, there may be 21 teeth 815, with each tooth 815 having a pitch diameter of about 1.2 inches (3.1 cm), an outside diameter of about 1.3 inches (3.3 cm), a root diameter of about 1.08 inches (2.74 cm), and a tooth thickness at the pitch diameter of about 0.1 inches (0.3 cm). Further, in some embodiments, the diameter of the bore 820 is about 0.75 inches (1.91 cm).

Figures 8A, 8B:
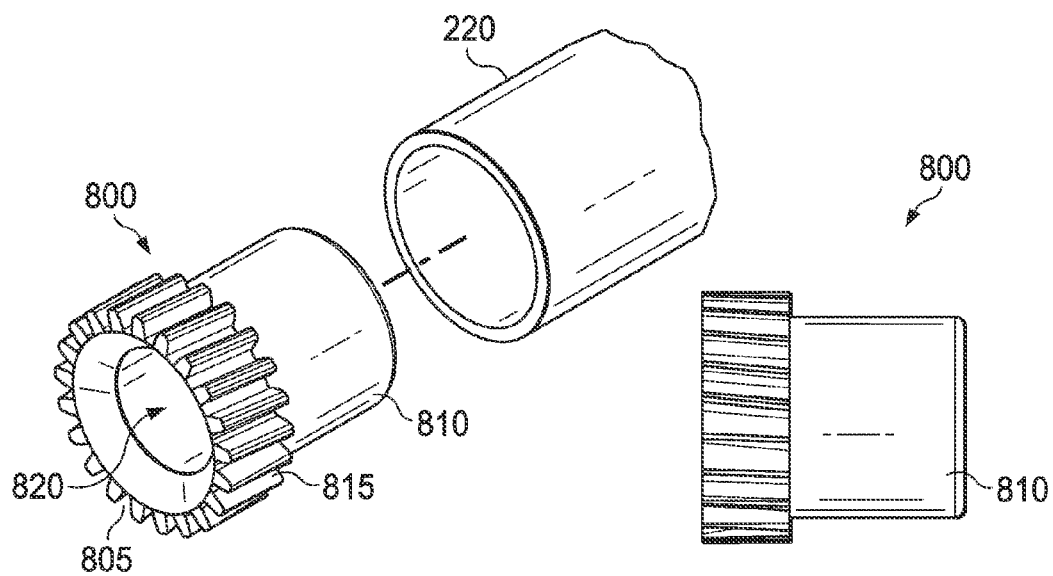
FIGS. 8A-8D illustrate an example worm gear that may be used in a roller grill according to the present disclosure.
Figures 8C, 8D:
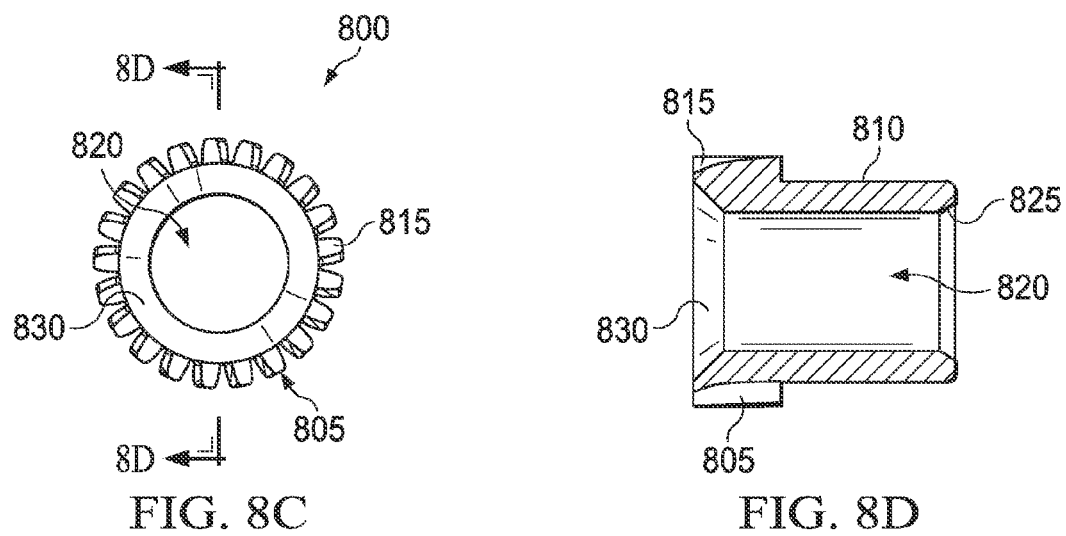

As illustrated in FIG. 8D, an end of the helical gear 800 that may be coupled to a heating tube includes a beveled surface 825 around a circumference of the outer diameter surface 810. In some embodiments, the beveled surface 825 may be set-off at an angle of about 30° from an interior surface of the outer diameter surface 810. Alternatively, other angular offsets are possible. In some embodiments, the beveled surface 825 may allow a heating element to be more easily inserted through the helical gear 800 from the heating tube 220.

As further illustrated in FIG. 8D, the gear head 805 also includes a beveled surface 830 around a circumference of the gear head 805. In some embodiments, the beveled surface 830 may be set-off at an angle of about 45° from an interior surface of the gear head 805. Alternatively, other angular offsets are possible. In some embodiments, a retainer or cover plate (such as the retainer plate 930) may include a concave portion 935 that protrudes into the gear head 805 adjacent the beveled surface 830. Thus, there may be more space allowed for wiring coupled to a heating element passing through the heating tube 220.

In some embodiments, the helical gear 800 may be coupled to the heating tube 220 (or another heating tube) as follows. First the outer diameter surface 810 may be inserted (e.g., all or partially) into the heating tube 220 until an end of the heating tube 220 is at or adjacent the gear head 805. Next, the heating tube 220 may be punched into the outer diameter surface 810 (e.g., by compressing the heating tube 220 into the outer diameter surface 810 and/or inserting a davit (not shown) through the heating tube 220 and outer diameter surface 810). Next, the assembly including the helical gear 800 and heating tube 220 may be rotated, for example, about 180°. The heating tube 220 may be punched again into the outer diameter surface 810 (e.g., by installing the heating tube 220 over the outer diameter surface 810) at a location about 180° about from the first punch location. In such a manner, the helical gear 800 may be coupled to the heating tube 220.

FIGS. 9A-9B illustrate an example bushing 900 that may be used in a roller grill, such as, for example, one or more of the roller grills 100, 200, 300, 400, and/or 600. In some embodiments, for example, the bushing 900 may be used as a bearing surface through which a heating tube (such as, for instance, the heating tube 120) may be inserted. As illustrated, the bushing 900 includes a pair of tubulars 910 connected by a web 905. Although FIG. 9A shows two tubulars 910, more or fewer tubulars 910 may be connected by the web 905. In some embodiments, the bushing 900 may be installed against an end plate of a roller grill, such as the side housing 205, such that the web 905 is mounted adjacent an outboard surface of the side housing 205 (e.g., facing a side plenum space of the roller grill) and the tubular portions 910 are inserted through holes in the side housing 205.

As illustrated in FIG. 9A, a retainer plate 915 may also be mounted in a roller grill substantially adjacent the bushing 900. The retainer plate 915 may include a number of apertures 925 receiving the tubulars 910. For instance, in some embodiments, the retainer plate 915 may be a single piece that extends (all or partially) a width of the roller grill with a 1:1 ratio of apertures 925 to heating tubes. In some embodiments, the retainer plate 915 may prevent (all or partially) the bushing 900 from movement (e.g., rotational) during rotation of heating tubes in the roller grill.

Turning to FIG. 9B, an example embodiment of the bushing 900 is illustrated with the roller grill 200. Alternatively, the bushing 900 may be used in the roller grill 100 illustrated in FIG. 1. As illustrated, the bushing 900 may be inserted through the side housing 205 such that the web 905 is in contacting engagement with an outboard surface of the side housing 205. The retainer plate 915 may be inserted over the tubulars 910 that extend into the plenum space adjacent the outbound surface of the side housing 205, thereby sandwiching the web 905 against the side housing 205. In some embodiments, the retainer plate 915 may be attached (e.g., mechanically) to the side housing 205.

As further illustrated in FIG. 9B, the retainer plate 930 may be mounted adjacent the gear head 805 of the helical gear 800 such that the concave portion 935 extends into the gear head 805 adjacent the beveled surface 830. In some embodiments, electrical wiring coupled to a heating element (not shown)

inserted through the heating tube 220 may be installed within a volume defined by the concave portion 935, thereby saving space within the plenum 223.

A number of embodiments have been described. Nevertheless, it will be understood that various modifications may be made. For example, various combinations of the components described herein may be provided for embodiments of similar apparatus. For instance, although belts and chains are shown in the illustrated embodiments, other types of looped surfaces (e.g., continuous looped surfaces) may be used in place of belts or chains. Accordingly, other embodiments are within the scope of the present disclosure.

What is claimed is:

1. A roller grill for heating a pre-cooked food product, comprising:
   a housing that comprises side portions and a bottom portion;
   a plurality of tubes having outer surfaces adapted to transfer heat to the pre-cooked food product, the tubes extending between the side portions and above the bottom portion;
   a plurality of spur gears, each spur gear mounted on an end of a corresponding tube;
   a drive assembly, comprising:
      a motor coupled to a fan, the motor and fan mounted beneath the plurality of tubes in the bottom portion of the housing;
      a timing pulley coupled to a shaft having a plurality of worm gears mounted thereon; and
      a timing belt coupled to the motor and the timing pulley and adapted to transfer rotary motion generated by the motor into rotary motion of the tubes through contacting engagement of the worm gears with the spur gears; and
   a cover plate mounted within a plenum of the side portion of the housing and adjacent the worm gears and spur gears, the plenum at least partially defined by a side housing of the roller grill and being in airflow communication with an ambient space through an aperture of the cover plate, wherein the cover plate extends across a width of the plenum that is orthogonal to a length of the plurality of tubes that extend lengthwise between side housings of the roller grill, and the cover plate serves as a heat sink adapted to receive heat transferred from the tubes through the plenum, wherein
   the fan is positioned to circulate airflow between the plenum and the ambient space, through the bottom portion, to cool the cover plate.

2. The roller grill according to claim 1, wherein at least one of the spur gears is a helical spur gear.

3. The roller grill according to claim 1, wherein the timing belt comprises a plurality of teeth protruding from a surface of the timing belt, the teeth engageable with a plurality of corresponding teeth disposed on a surface of the timing pulley.

4. The roller grill according to claim 1, further comprising a side housing, wherein the plurality of tubes are mounted through a panel of the side housing, and the worm gears are engaged with the spur gears within the plenum defined by the side housing.

5. The roller grill according to claim 4, wherein the plurality of tubes extend through a volume of the roller grill adjacent a first side of the panel opposite a second side of the panel adjacent the plenum.

6. The roller grill according to claim 4, wherein the plenum has a width of approximately 1.625 inches (4.128 cm).

7. The roller grill according to claim 1, further comprising a bottom housing adapted to at least partially enclose the motor.

8. The roller grill according to claim 7, wherein the timing belt extends from the bottom housing through the panel and into the plenum to engage the timing pulley.

9. The roller grill according to claim 1, further comprising a plurality of heating elements, wherein at least one of the plurality of heating elements extends through a bore of one of the tubes.

10. The roller grill according to claim 1, wherein each of the plurality of tubes comprises a heating surface having a length of approximately 32.5 inches (82.6 cm).

11. The roller grill according to claim 1, wherein the plurality of tubes comprises at least 8 tubes.

12. The roller grill according to claim 1, wherein a ratio of spur gears to worm gears is 1:1 or 2:1.

13. The roller grill according to claim 1, further comprising a timing gear mounted on the shaft and engageable with the timing belt.

14. The roller grill according to claim 1, wherein at least one of the spur gears comprises a self-lubricating gear.

15. An apparatus for heating a pre-cooked food product, comprising:
   a bottom housing mounted between a first side housing and a second side housing;
   a plurality of legs mounted to the bottom housing;
   a plurality of tubes across a volume defined between the first and second side housings and above the bottom housing, the plurality of tubes comprising outer surfaces adapted to transfer heat to the pre-cooked food product, the plurality of tubes are mounted through a panel of the first side housing;
   at least one drive assembly comprising:
      a plurality of spur gears, each spur gear mounted on an end of a corresponding tube;
      a motor, and a fan coupled to the motor, mounted beneath the plurality of tubes within the bottom housing, the motor comprising a motor shaft coupled to a timing gear;
      a timing pulley coupled to a shaft having a plurality of worm gears mounted thereon, the worm gears engaged with the spur gears within a plenum defined by the first side housing; and
      a timing belt engaged with the timing gear and the timing pulley and adapted to transfer rotary motion of the timing gear into rotary motion of the tubes through contacting engagement of the worm gears with the spur gears; and
   a cover plate mounted within a plenum adjacent the worm gears and spur gears, the plenum at least partially defined by the first side housing of the roller grill and being in airflow communication with an ambient space through an aperture of the cover plate, wherein the cover plate extends across a width of the plenum that is orthogonal to a length of the plurality of tubes that extend lengthwise between the first and second side housings of the roller grill, and the cover plate serves as a heat sink adapted to receive heat transferred from the tubes through the plenum, wherein
   the fan is positioned to circulate airflow between the plenum and the ambient space, through the bottom housing, to cool the cover plate.

16. The apparatus according to claim 15, wherein at least one of the spur gears is a helical spur gear.

17. The apparatus according to claim 15, wherein the timing belt comprises a plurality of teeth protruding from a surface of the timing belt, the teeth engageable with a plurality of corresponding teeth disposed on a surface of the timing pulley and a plurality of corresponding teeth disposed on a surface of the timing gear.

18. The apparatus according to claim 15, further comprising a plurality of heating elements, wherein at least one of the plurality of heating elements extends through a bore of one of the tubes.

19. The apparatus according to claim 15, wherein a ratio of spur gears to worm gears is 1:1 or 2:1.

20. The apparatus according to claim 15, wherein the bottom housing comprises at least one louver adapted to permit airflow between a cavity enclosed within the bottom housing and an ambient airspace.

21. The roller grill according to claim 1, wherein the timing belt extends from the bottom portion of the housing, and into one of the side portions of the housing through the plenum, to couple to the timing pulley that is mounted in the plenum.

\* \* \* \* \*

UNITED STATES PATENT AND TRADEMARK OFFICE
CERTIFICATE OF CORRECTION

PATENT NO. : 8,857,321 B2
APPLICATION NO. : 13/284217
DATED : October 14, 2014
INVENTOR(S) : Robert Jeffery Hankins et al.

It is certified that error appears in the above-identified patent and that said Letters Patent is hereby corrected as shown below:

Title page item [56] (U.S. Patent Documents), entry 20, delete "Bardeau" and insert -- Bardeau et al., --, therefor.

In the Specification

Column 1, line 13, delete "tacquitos," and insert -- taquitos, --, therefor.

Column 11, line 61, delete "Btu/(hrft° F.)" and insert -- Btu/(hr·ft° F.) --, therefor.

Column 12, line 59, delete "Btu/(hrft° F.)" and insert -- Btu/(hr·ft° F.) --, therefor.

Column 12, line 64, delete "Btu/(hrft° F.)" and insert -- Btu/(hr·ft° F.) --, therefor.

Signed and Sealed this
Thirty-first Day of March, 2015

Michelle K. Lee
*Director of the United States Patent and Trademark Office*